US010171989B2

(12) United States Patent
Bin Sediq et al.

(10) Patent No.: US 10,171,989 B2
(45) Date of Patent: Jan. 1, 2019

(54) TRANSMITTING USER DATA TO A WIRELESS COMMUNICATION DEVICE OVER A CONTROL CHANNEL

(71) Applicant: Telefonaktiebolaget L M Ericsson (publ), Stockholm (SE)

(72) Inventors: Akram Bin Sediq, Ottawa (CA); Ahmed Nouah, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 256 days.

(21) Appl. No.: 14/781,387

(22) PCT Filed: Sep. 17, 2015

(86) PCT No.: PCT/IB2015/057181
§ 371 (c)(1),
(2) Date: Sep. 30, 2015

(87) PCT Pub. No.: WO2017/046633
PCT Pub. Date: Mar. 23, 2017

(65) Prior Publication Data
US 2017/0265060 A1  Sep. 14, 2017

(51) Int. Cl.
H04W 4/00     (2018.01)
H04W 8/20     (2009.01)
(Continued)

(52) U.S. Cl.
CPC .......... H04W 8/205 (2013.01); H04L 1/0003 (2013.01); H04L 5/0044 (2013.01);
(Continued)

(58) Field of Classification Search
None
See application file for complete search history.

(56) References Cited

U.S. PATENT DOCUMENTS 7,230,992 B2   6/2007  Walker et al.
7,599,446 B2  10/2009  Moon et al.
(Continued)

FOREIGN PATENT DOCUMENTS

EP   2066052 A2   6/2009
EP   2985936 A1   2/2016
(Continued)

OTHER PUBLICATIONS

Catt, "Hierarchical MIMO scheme for LTE-A MBMS", 3GPP TSG RAN WG1 Meeting #56, Athens, Greece, Feb. 9, 2009, pp. 1-3, R1-090947, 3GPP.
(Continued)

Primary Examiner — Anh Vu H Ly
(74) Attorney, Agent, or Firm — Coats & Bennett, PLLC

(57) ABSTRACT

A wireless communication device (16A) is configured to receive user data from a radio network node (18) in a wireless communication system (10) that includes a data channel (26) over which user data is transmitted and a control channel (24) over which control data is transmitted. The device (16A) receives over the control channel (24) a hierarchically-modulated symbol (28) which conveys control data on a control-data modulation layer (30A) and conveys user data on a user-data modulation layer (30B). The control-data modulation layer (30A) is recoverable via demodulation at a lower order, and the user-data modulation layer (30B) is recoverable via demodulation at a higher order. The lower order is lower than the higher order and is generally predefined independent of conditions on the control channel (24). The device (16A) recovers the user data received over the control channel (24) by demodulating at least the user-data modulation layer (30B) at the higher order.

30 Claims, 14 Drawing Sheets

(51) Int. Cl.
*H04L 1/00* (2006.01)
*H04L 5/00* (2006.01)
*H04L 27/34* (2006.01)
*H04L 27/18* (2006.01)
*H04W 92/10* (2009.01)
*H04L 1/18* (2006.01)

(52) U.S. Cl.
CPC .......... *H04L 5/0053* (2013.01); *H04L 27/186* (2013.01); *H04L 27/3488* (2013.01); *H04L 1/1887* (2013.01); *H04W 92/10* (2013.01)

(56) References Cited

U.S. PATENT DOCUMENTS

| | | | |
|---|---|---|---|
| 7,826,339 | B2 | 11/2010 | Kalhan |
| 7,826,340 | B2 | 11/2010 | Kalhan |
| 7,986,746 | B2 | 7/2011 | Steer |
| 8,218,421 | B2 * | 7/2012 | Niemela ............ H04L 27/0008 370/207 |
| 8,259,848 | B2 | 9/2012 | Malladi |
| 8,514,967 | B2 | 8/2013 | Wu |
| 8,559,371 | B2 | 10/2013 | Wu et al. |
| 8,626,177 | B2 | 1/2014 | Yoon et al. |
| 8,824,601 | B2 | 9/2014 | Malladi |
| 8,982,806 | B2 | 3/2015 | Parkvall et al. |
| 9,660,766 | B2 | 5/2017 | Kim et al. |
| 2005/0068918 | A1 | 3/2005 | Mantravadi et al. |
| 2008/0280630 | A1 | 11/2008 | Kalhan et al. |
| 2009/0003486 | A1 | 1/2009 | Kwon et al. |
| 2011/0064030 | A1 | 3/2011 | Wu et al. |
| 2011/0142143 | A1 * | 6/2011 | Wu .................... H04L 27/3488 375/259 |
| 2011/0274018 | A1 | 11/2011 | Steer |
| 2012/0046027 | A1 | 2/2012 | Baker et al. |
| 2015/0326360 | A1 * | 11/2015 | Malladi ................ H04L 5/0032 370/329 |

FOREIGN PATENT DOCUMENTS

| | | |
|---|---|---|
| WO | 2007123366 A2 | 11/2007 |
| WO | 2014183461 A1 | 11/2014 |
| WO | 2015009101 A1 | 1/2015 |

OTHER PUBLICATIONS

Vanka, et al., "Superposition Coding Strategies: Design and Performance Evaluation", Presentation, 2012, obtained on Sep. 30, 2015, obtained from internet: http://www3.nd.edu/~mhaenggi/pubs/SPC_Slides.pdf.
Fujitsu, "An Efficient Hierarchical Modulation based DL Data Transmission for LTE-Advanced", 3GPP TSG-RAN1 #56, Athens, Greece, Feb. 9, 2009, pp. 1-9, R1-090710 (presentation).
Hoymann, et al., "LTE Technology Update: Part 2. A Lean Carrier for LTE", IEEE Communications Magazine, Feb. 1, 2013, pp. 74-80, IEEE.
Fujitsu, "An Efficient Hierarchical Modulation based DL Data Transmission for LTE-Advanced", 3GPP TSG-RAN1 #56, Athens, Greece, Feb. 9, 2009, pp. 1-17, R1-090710, 3GPP.
Vanka, S. et al., "Superposition Coding Strategies: Design and Experimental Evaluation", IEEE Transactions on Wireless Communications, Jul. 1, 2012, pp. 2628-2639, vol. 11, No. 7, IEEE.
Le Goff, S., et al., "Turbo-codes and high spectral efficiency modulation", IEEE International Conference on Communications, Conference Record, 'Serving Humanity Through Communications.' May 1, 1994, pp. 645-649, vol. 2, IEEE.
Wikipedia, "Hierarchical modulation", Wikipedia, The Free Encyclopedia, last updated Jun. 24, 2014, retrieved on Sep. 22, 2015, retrieved from internet: http://en.wikipedia.org/w/index.php?title=Hierarchical_modulation&oldid=614274073 (accessed Jun. 2, 2015). http://en.wikipedia.org/wiki/Hierarchical_modulation.
3rd Generation Partnership Project, "Physical Layer for Ultra Mobile Broadband (UMB) Air Interface Specification", 3GPP2 C.S0084-001-0 v3.0, Aug. 1, 2008, pp. 1-272, retrieved on Sep. 22, 2015, retrieved from internet: http://www.3gpp2.org/public_html/specs/C.S0084-001-0_v3.0_080902.pdf.
3rd Generation Partnership Project, "3rd Generation Partnership Project; Technical Specification Group Radio Access Network; Evolved Universal Terrestrial Radio Access (E-UTRA); Physical channels and modulation (Release 12)", Technical Specification, 3GPP TS 36.211 V12.4.0, Dec. 1, 2014, pp. 1-124, 3GPP, France.
3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.4.0, Dec. 1, 2014, pp. 1-225 3GPP, France.
Response to PCT Written Opinion (dated Aug. 12, 2016—4 pages) In re: International application No. PCT/IB2015/057181.

* cited by examiner

Legend: xx|yyyy    xx: control data bits    yyyy: user data bits

US 10,171,989 B2

TRANSMITTING USER DATA TO A WIRELESS COMMUNICATION DEVICE OVER A CONTROL CHANNEL

TECHNICAL FIELD

The present application generally relates to transmitting user data to a wireless communication device, and particularly relates to transmitting the user data to the wireless communication device over a control channel.

BACKGROUND

A wireless communication system defines different channels over which to transmit data between a radio network node and a wireless communication device. Different types of channels carry different types of data. For example, a data channel carries user data, and a control channel carries control data. Because the control data supports transmission of the user data over the data channel, the control data proves important enough to transmit with as low a modulation order as necessary to guarantee robustness against noise and interference.

In at least some contexts, though, practical constraints prevent the system from dynamically adapting the control channel's modulation order to current channel conditions. This effectively requires the system to statically fix the control channel's modulation order to the most robust option, and thereby artificially cap the control channel's spectral efficiency even in the presence of favorable channel conditions. With the control channel's spectral efficiency limited in this way, the control channel requires more transmission resources than would otherwise be required.

Consider for instance a Physical Downlink Control Channel (PDCCH) in a system that is or evolves from Long Term Evolution (LTE). A PDCCH is a physical channel that carries control data called Downlink Control Information (DCI). This DCI among other things supports transmission of user data over the Physical Downlink Shared Channel (PDSCH). The DCI in this regard informs a user equipment (UE) about the location of the physical resource block pairs allocated to it in the PDSCH, as well as the modulation scheme that the UE needs to use for recovering its user data on the PDSCH. Although the PDCCH signals the PDSCH's modulation order, there is no mechanism to signal the modulation order of the PDCCH itself. And requiring the UE to blindly detect that modulation order would unacceptably increase UE complexity. As a result, the PDCCH's modulation scheme remains fixed as Quadrature Phase-Shift Keying (QPSK). With the PDCCH's modulation order thereby fixed at the most robust order of 4, the maximum spectral efficiency for the PDCCH is always less than 2 bits/sec/Hz, even for UEs with the most favorable channel conditions. Similar challenges exist for the enhanced PDCCH (ePDCCH) as another example.

SUMMARY

One or more embodiments herein transmit both control data and user data over a control channel using hierarchical modulation. The control data is recoverable via demodulation at a lower order that is generally predefined independent of conditions on the control channel. The user data is recoverable via demodulation at a higher order. In at least some embodiments, the system dynamically adapts this higher order to current channel conditions so as to maximize the control channel's spectral efficiency, while at the same time still allowing the system to statically fix the modulation order for the control data, e.g., to ensure control data robustness and minimize control data decoding complexity. By transmitting both control data and user data over a control channel using hierarchical modulation, spectral efficiency of the control channel may be improved.

More specifically, one or more embodiments herein include a method implemented by a wireless communication device for receiving user data from a radio network node in a wireless communication system that includes a data channel over which user data is transmitted and a control channel over which control data is transmitted. The method includes receiving over the control channel a hierarchically-modulated symbol which conveys control data on a control-data modulation layer and conveys user data on a user-data modulation layer. The control-data modulation layer is recoverable via demodulation at a lower order, and the user-data modulation layer is recoverable via demodulation at a higher order. The lower order is lower than the higher order and is predefined independent of conditions on the control channel. The method also includes recovering the user data received over the control channel by demodulating at least the user-data modulation layer at the higher order.

In some embodiments, the method at the device further comprises dynamically determining the higher order from received control signaling that indicates the higher order. The higher order is dynamically adapted in dependence of conditions on the control channel at the wireless communication device.

Alternatively or additionally, the method comprises performing the demodulating responsive to dynamically determining that the hierarchically-modulated symbol conveys user data intended for the wireless communication device, based on received control signaling that indicates on which transmission resources one or more hierarchically-modulated symbols are transmitted for conveying user data intended for the wireless communication device.

In one or more embodiments, recovery of the user data comprises demodulating both the user-data modulation layer and the control-data modulation layer at the higher order, to obtain higher-order demodulated data. In this case, the device disregards a subset of the higher-order demodulated data corresponding to the control-data modulation layer. The device then recovers the user data as a different subset of the higher-order demodulated data corresponding to the user-data modulation layer.

In some embodiments, the method also comprises recovering the control data by demodulating the control-data modulation layer at the lower order. In this case, the method may also comprise attempting to blindly decode a control data message formed at least in part from the recovered control data. The method may then further comprise determining whether the control data message is addressed to the wireless communication device based on whether the attempt to blindly decode the control data message succeeds.

Embodiments herein also include a method implemented by a radio network node for transmitting user data to a wireless communication device in a wireless communication system that includes a data channel over which user data is transmitted and a control channel over which control data is transmitted. The method comprises transmitting user data to the wireless communication device or a different wireless communication device over the data channel. The method further comprises forming a hierarchically-modulated symbol which conveys control data on a control-data modulation layer and conveys user data on a user-data modulation layer. The control-data modulation layer is recoverable via demodulation at a lower order, and the user-data modulation layer is recoverable via demodulation at a higher order. The lower order is lower than the higher order and is predefined independent of conditions on the control channel. The method also comprises transmitting the hierarchically-modulated symbol to the wireless communication device over the control channel.

The method at the radio network node in some embodiments further comprises dynamically determining that conditions on the control channel at a wireless communication device to which the control data is addressed support the higher order, and performing the forming and transmitting responsive to that determination.

Alternatively or additionally, the method at the radio network node further entails dynamically pairing the wireless communication device with a different wireless communication device for hierarchical modulation of the user data and control data respectively addressed to the devices. In some embodiments, this dynamic pairing may comprise evaluating on a transmission interval by transmission interval basis different possible pairings of wireless communication devices whose conditions on the control channel support the higher order, and selecting the pairing from the different possible pairings based on maximizing a defined utility metric. In some embodiments, for example, the defined utility metric characterizes capacity gained by a possible pairing relative to an overhead required for that possible pairing.

In any of the above methods, whether at the device or radio network node, the control data conveyed by the hierarchically-modulated symbol is in some embodiments addressed to a different wireless communication device than the wireless communication device to which the user data is addressed. In some embodiments, for example, from the perspective of the different wireless communication device, the control channel is reserved exclusively for conveying control data. The different wireless communication device in this case is configured to exclusively recover control data conveyed over the control channel by only demodulating symbols received over the control channel at the lower order, even when conditions on the control channel at the different wireless communication device support demodulation at the higher order.

Also in any of the above methods, control signaling from the radio network node to the wireless communication device indicates the higher order in some embodiments. Alternatively or additionally, control signaling from the radio network node to the wireless communication device indicates on which transmission resources one or more hierarchically-modulated symbols are transmitted for conveying user data intended for the wireless communication device. In either case, this control signaling may comprise the control data conveyed by the hierarchically-modulated symbol, control data conveyed by a different modulation symbol over a different control channel, and/or (e.g., semi-static) control signaling that is transmitted on a time basis slower than a time basis on which the control data is transmitted over the control channel.

In still further embodiments, the higher order in any of the above methods may be dynamically adapted in dependence on conditions on the control channel at the wireless communication device.

In some embodiments, the radio network node also transmits user data to the wireless communication device over the data channel.

Also in any of the above methods, the wireless communication system in some embodiments is or evolves from a Long Term Evolution, LTE, system, the control channel is a Physical Downlink Control Channel, PDCCH, or an enhanced Physical Downlink Control Channel, ePDCCH, and the control data is Downlink Control Information.

Further, the control-data modulation layer is recoverable in some embodiments via Quadrature Phase Shift Keying, QPSK, demodulation, and the user-data modulation layer is recoverable via M-QAM demodulation, where M is greater than 4.

Embodiments herein also include corresponding apparatus, computer programs, and computer program products.

In particular, embodiments herein include a wireless communication device for receiving user data from a radio network node in a wireless communication system that includes a data channel over which user data is transmitted and a control channel over which control data is transmitted. The wireless communication device is configured to receive over the control channel a hierarchically-modulated symbol which conveys control data on a control-data modulation layer that is recoverable via demodulation at a lower order, and conveys user data on a user-data modulation layer that is recoverable via demodulation at a higher order. The lower order is lower than the higher order and is predefined independent of conditions on a control channel. The wireless communication device is also configured to recover the user data by demodulating at least the user-data modulation layer at the higher order.

Some embodiments herein include a wireless communication device for receiving user data from a radio network node in a wireless communication system that includes a data channel over which user data is transmitted and a control channel over which control data is transmitted. The wireless communication device comprises a receiving module configured to receive over the control channel a hierarchically-modulated symbol which conveys control data on a control-data modulation layer that is recoverable via demodulation at a lower order, and conveys user data on a user-data modulation layer that is recoverable via demodulation at a higher order. The lower order is lower than the higher order and is predefined independent of conditions on the control channel. The wireless communication device further comprises a demodulation module configured to recover the user data by demodulating at least the user-data modulation layer at the higher order.

Embodiments further include a radio network node for transmitting user data to a wireless communication device in a wireless communication system that includes a data channel over which user data is transmitted and a control channel over which control data is transmitted. The radio network node is configured to transmit user data to the wireless communication device or a different wireless communication device over the data channel. The radio network node is further configured to form a hierarchically modulated symbol which conveys control data on a control-data modulation layer that is recoverable via demodulation at a lower order, and conveys user data on a user-data modulation layer that is recoverable via demodulation at a higher order. The lower order is lower than the higher order and is predefined independent of conditions on the control channel. The radio network node is also configured to transmit the hierarchically modulated symbol to the wireless communication device over the control channel.

Some embodiments herein include a radio network node for transmitting user data to a wireless communication device in a wireless communication system that includes a data channel over which user data is transmitted and a control channel over which control data is transmitted. The radio network node comprises a transmission module configured to transmit user data to the wireless communication device or a different wireless communication device over the data channel. The radio network node further comprises a forming module configured to form a hierarchically modulated symbol which conveys control data on a control-data modulation layer that is recoverable via demodulation at a lower order, and conveys user data on a user-data modulation layer that is recoverable via demodulation at a higher order. The lower order is lower than the higher order and is predefined independent of conditions on the control channel. The radio network node's transmission module is also configured to transmit the hierarchically modulated symbol to the wireless communication device over the control channel.

Still other embodiments include a computer program comprising instructions which, when executed by at least one processor of a node, causes the node to carry out any of the methods above. Embodiments also include a carrier containing the computer program, wherein the carrier is one of an electronic signal, optical signal, radio signal, or computer readable storage medium.

DETAILED DESCRIPTION

Figure 1:
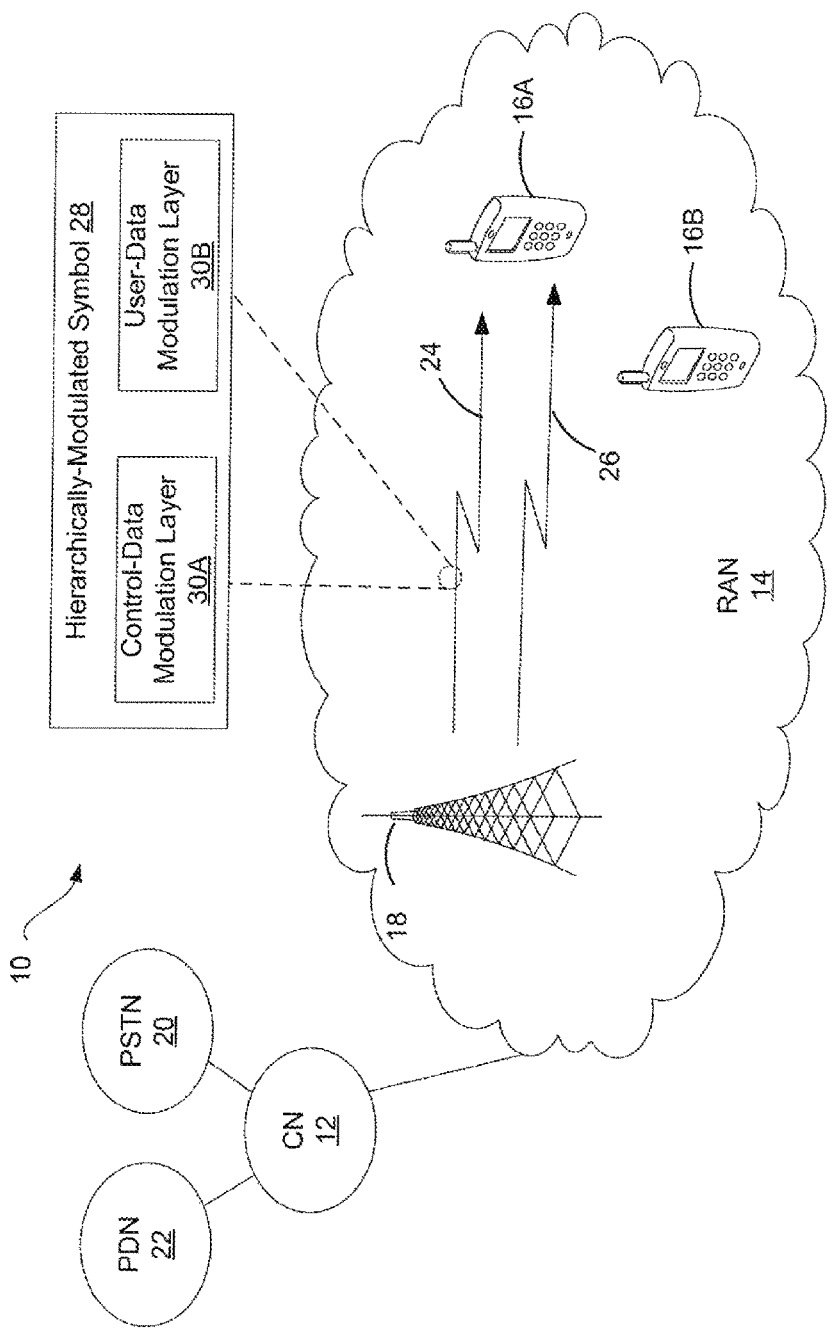
FIG. 1 is a block diagram of a wireless communication system according to one or more embodiments.

FIG. 1 depicts a wireless communication system 10 according to one or more embodiments herein. As shown, the system 10 includes a core network (CN) 12 as well as a radio access network (RAN) 14. The RAN 14 provides wireless communication devices 16 with radio access to the CN 12 via a plurality of radio network nodes 18, one of which is shown. The CN 12 in turn connects the wireless communication devices 16 to one or more external networks. The one or more external networks are shown as a public switched telephone network (PSTN) 20 and a packet data network (PDN) 22 such as the Internet.

The system 10 includes one or more data channels 26 (one of which is shown) over which user data is transmitted. The system 10 also includes one or more control channels 24 (one of which is shown) over which control data is transmitted. Control data as used herein supports transmission of user data over a data channel 26. In one or more embodiments, this user data comprises data directly or indirectly addressed to a wireless communication device 16, or its user (if any), in association with an application executing on the device 16. In some embodiments, a data channel 26 may transport not only user data, but also a different type of control data than that transported by a control channel 24. For example, one type of control data may be transmitted over a data channel 26 on a time basis slower than a time basis on which a different type of control data is transmitted over a control channel 24. In at least some embodiments, the type of control data transmitted over a data channel 26 generally controls transmission of user data at a higher protocol layer (e.g., a radio resource control layer) whereas the type of control data transmitted over a control channel 24 generally controls transmission of user data at a lower protocol layer (e.g., a physical layer). In at least some embodiments, the system 10 includes a data channel 26 over which different user data is conveyed for different users in a shared fashion, but includes multiple different control channels 24 that exclusively convey different control data for different individual devices 16. That is, in such embodiments, any control data conveyed on any given control channel 24 is exclusively addressed to one particular device 16. In some embodiments where the system 10 is or evolves from Long Term Evolution (LTE), for example, the control channel 24 is a Physical Downlink Control Channel (PDCCH) or an enhanced PDCCH (ePDCCH), the data channel 26 is a Physical Downlink Shared Channel (PDSCH), the control data is Downlink Control Information (DCI), and the user data is PDSCH user data, e.g., from the Dedicated Traffic Channel (DTCH).

Figure 2:
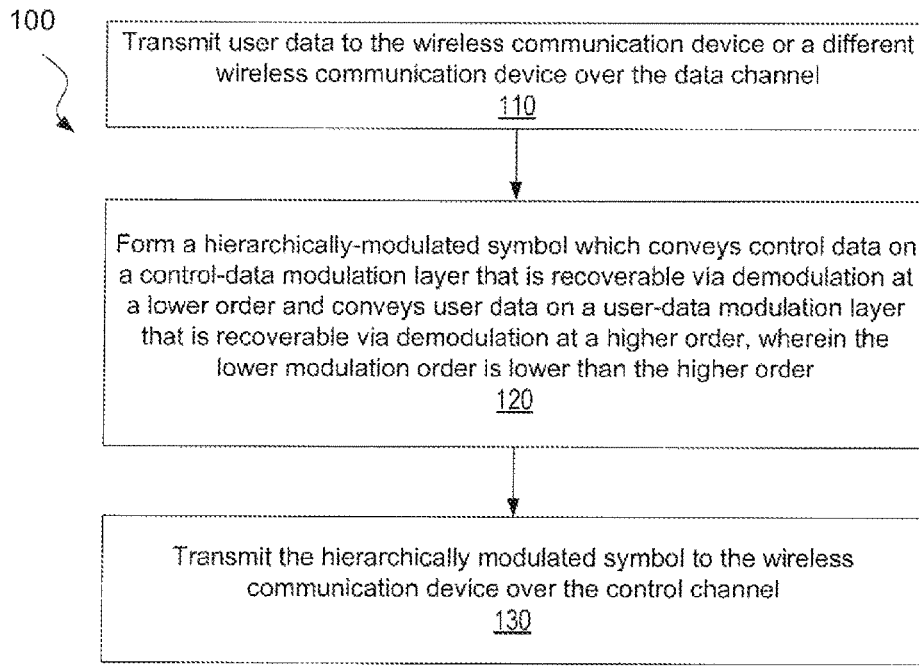
FIG. 2 is a logic flow diagram of a method implemented by a radio network node according to one or more embodiments.
Figure 3:
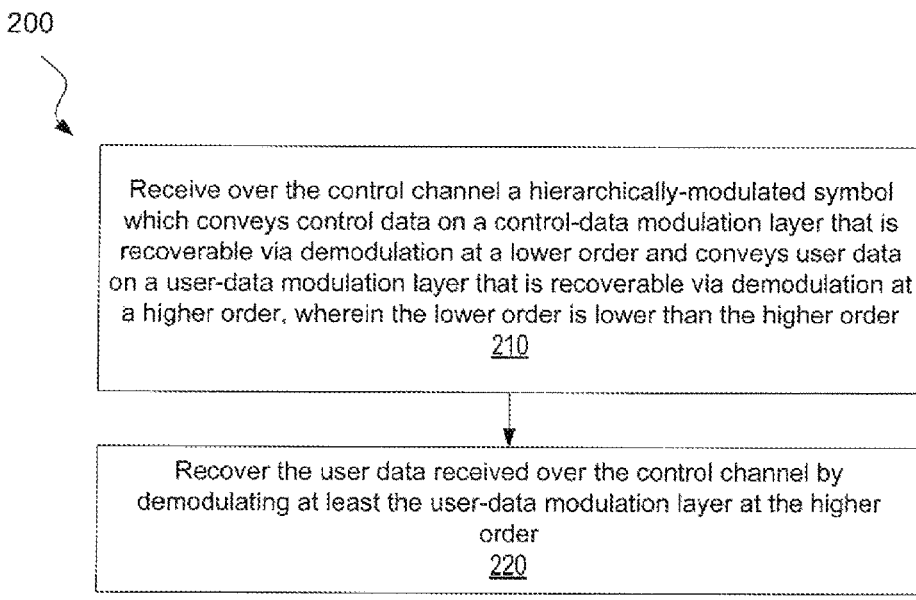
FIG. 3 is a logic flow diagram of a method implemented by a wireless communication device according to one or more embodiments.

Regardless, a radio network node 18 herein not only transmits control data over a control channel 24, but also transmits user data over that control channel 24, e.g., in addition to transmitting user data over a data channel 26 at the same or a different time. The radio network node 18 advantageously does so using hierarchical modulation. Hierarchical modulation effectively performs modulation division multiplexing so as to multiplex different data onto different modulation layers (e.g., a QPSK layer and a 16-QAM layer) of the same modulation symbol. By multiplexing user data and control data onto the same symbol using hierarchical modulation, the radio network node 18 in some embodiments improves the control channel's spectral efficiency, yet still conforms to constraints imposed on transmission of the control data. FIGS. 2 and 3 respectively illustrate additional details regarding processing performed by the radio network node 18 and the wireless communication device 16A according to one or more embodiments.

Specifically, FIG. 2 shows processing 100 that the radio network node 18 performs for transmitting user data to the wireless communication device 16A in a wireless communication system 10 that includes a data channel 26 over which user data is transmitted and a control channel 24 over which control data is transmitted. The processing 100 comprises transmitting user data to the wireless communication device 16A or a different wireless communication device over the data channel 26 (Block 110). The radio network node 18 may do so at the same or a different time. Processing 100 further comprises forming a hierarchically-modulated symbol 28 as shown in FIG. 1. The hierarchically-modulated symbol 28 conveys control data on a control-data modulation layer 30A and conveys user data on a user-data modulation layer 30B (Block 120). The control-data modulation layer 30A is recoverable via demodulation at a lower order, whereas the user-data modulation layer 30B is recoverable via demodulation at a higher order. This lower order is lower in the sense that it is lower than the higher order. In some embodiments, for instance, the control-data modulation layer 30A and thereby the control data on that layer 30A is recoverable via QPSK demodulation (i.e., an order of 4), but the user-data modulation layer 30B and the user data on that layer 30B is only recoverable via M-QAM demodulation, where M is greater than 4 (e.g., 16). Regardless, in some embodiments, the lower order is predefined independent of conditions on the control channel 24. That is, the radio network node 18 refrains from dynamically adapting the lower order based on control channel conditions at the device 16A, e.g., to ensure control data robustness and minimize control data decoding complexity. With the hierarchically-modulated symbol 28 formed in this way, processing 100 at the radio network node 100 comprises transmitting the symbol 28 to the wireless communication device 16A over the control channel 24 (Block 130).

FIG. 3 shows corresponding processing 200 that the wireless communication device 16A performs for receiving the user data from the radio network node 18 in a wireless communication system 10 that includes a data channel 26 over which user data is transmitted and a control channel 24 over which control data is transmitted. As shown, the device-side processing 200 comprises receiving the hierarchically-modulated symbol 28 over the control channel 24 (Block 210). Again, the symbol 28 conveys control data on the control-data modulation layer 30A and conveys user data on the user-data modulation layer 30B. Processing 200 at the device 16A further comprises recovering the user data received over the control channel 24 by demodulating at least the user-data modulation layer 30B at the higher order (Block 220). In some embodiments, processing 200 also includes the device 16A receiving user data over the data channel 26.

Figure 4:
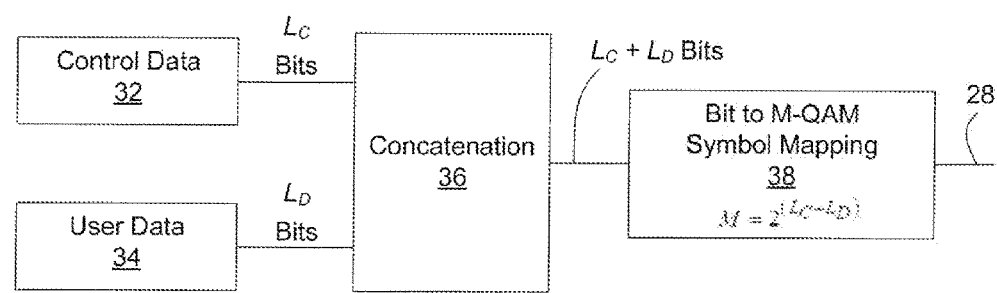
FIG. 4 is a block diagram of hierarchical modulation of control data and user data according to one or more embodiments.

FIG. 4 illustrates additional details of this hierarchical modulation approach according to at least some embodiments. As shown, the radio network node 18 forms the hierarchically-modulated symbol 28 as an M-QAM symbol of modulation order M. To do so, the radio network node 18 obtains $L_C$ bits of control data 32 and $L_D$ bits of user data 34. In at least some embodiments, the radio network node 18 obtains the same number $L_C$ of bits of control data 32 independent of conditions on the control channel 24. Regardless, the radio network node 18 performs concatenation 36 of the control data bits and the user data bits into a total of $L_C+L_D$ bits. The radio network node 18 then performs bit-to-M-QAM symbol mapping 38, with $M=2^{(L_C+L_D)}$, in order to produce an M-QAM symbol as the hierarchically-modulated symbol 28. This mapping 38 effectively multiplexes the control data bits and the user data bits on different respective modulation layers that are recoverable with demodulation at different orders. The control-data modulation layer is recoverable via demodulation at order $M_C=2^{L_C}$ whereas the user-data modulation layer is recoverable via demodulation at order M. The user data is recoverable via demodulation at order M, rather than order $2^{L_D}$, because the user data is mapped to the M-order symbols in such a way that the user data is only distinguishable through at least M-order demodulation. The control data by contrast is recoverable via demodulation at order $M_C$, because the control data is mapped to the M-order symbols in such a way that the user data is distinguishable through $M_C$-order demodulation.

Figure 5A:
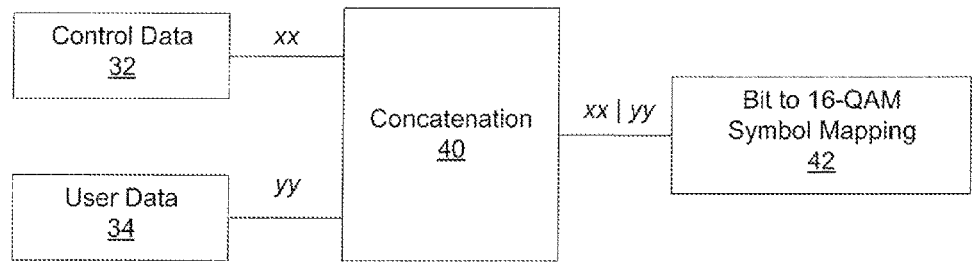
FIGS. 5A-5B are block diagrams of QPSK/16-QAM hierarchical modulation of control data and user data according to one or more embodiments.
Figure 5B:
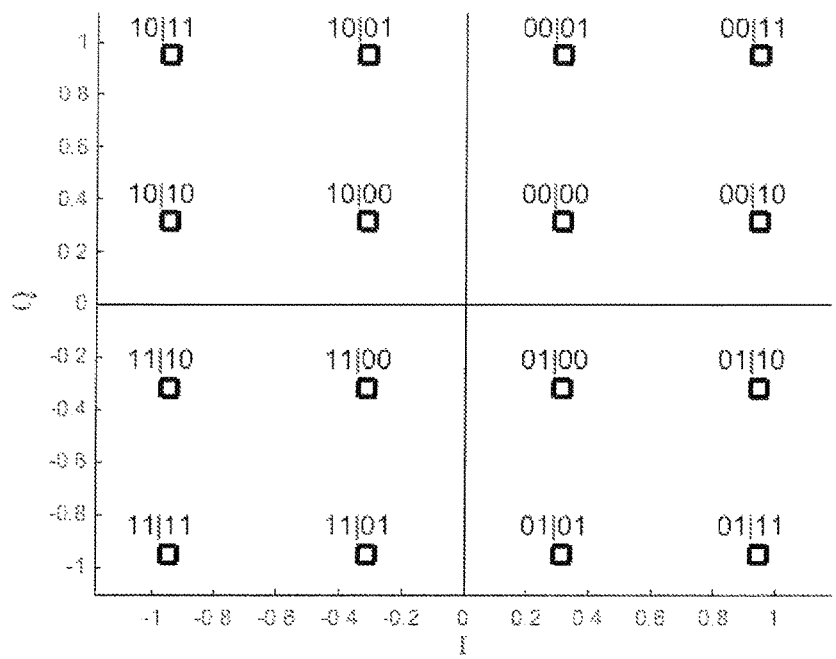

FIGS. 5A-5B show an example where the radio network node 18 forms the hierarchically-modulated symbol 28 as a 16-QAM symbol. As depicted in FIG. 5A, the radio network node 18 obtains 2 control data bits xx and 2 user data bits yy, and performs concatenation 40 of those bits according to xx|yy. The radio network node 18 then performs a mapping 42 of the concatenated bits xx|yy into a 16-QAM symbol such that the control data bits xx are mapped onto one modulation layer (namely, the control-data modulation layer 30A) and the user data bits yy are mapped onto a different modulation layer (namely, the user-data modulation layer 30B).

FIG. 5B shows one example of different possible mappings in this regard. The radio network node 18 maps concatenated bits xx|yy to symbols in the 16-QAM constellation such that different combinations of control data bits xx are mapped to different quadrants (e.g., 00 maps to the upper right quadrant, 10 maps to the upper left quadrant, 11 maps to the lower left quadrant, and 01 maps to the lower right quadrants). This means that the control data bits xx can be recovered with QPSK demodulation, even though the symbol transmitted is 16-QAM, since QPSK demodulation just requires distinguishing the quadrant of the received symbol. The radio network node 18 also maps concatenated bits xx|yy to symbols in the 16-QAM constellation such that different combinations of user data bits yy are mapped to different symbols within the same quadrant. This means that the user data bits yy can only be recovered with 16-QAM demodulation, not QPSK demodulation. With recovery of the control data bits xx requiring at least QPSK demodulation, while recovery of the user data bits yy requires at least 16-QAM demodulation, the control data bits xx and user data bits yy are effectively multiplexed onto different modulation layers (a QPSK layer recoverable via demodulation at a relatively lower order of 4 and a 16-QAM layer recoverable via demodulation at a relatively higher order of 16). In this way, recovery of the user data bits yy proceeds via demodulation that effectively views the received symbol as a 16-QAM symbol within a 16-QAM constellation, whereas recovery of the control data bits xx proceeds via demodulation that effectively views the received symbol as a QPSK symbol within an overlaid QPSK constellation. That is, demodulation effectively maps the received symbol 28 to a QPSK constellation to recover the control data, but maps the received symbol 28 to a 16-QAM constellation to recover the user data.

Figure 6A:
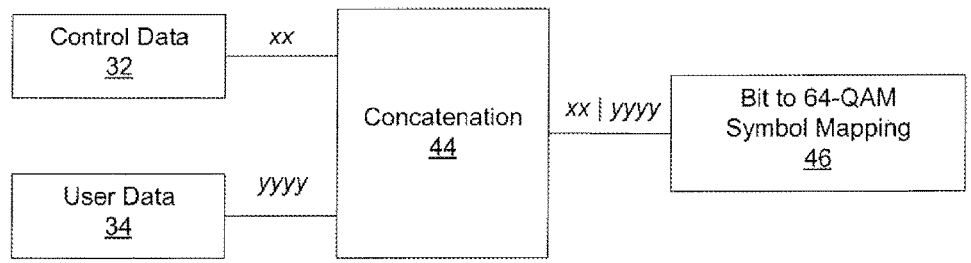
FIGS. 6A-6B are block diagrams of QPSK/64-QAM hierarchical modulation of control data and user data according to one or more embodiments.
Figure 6B:
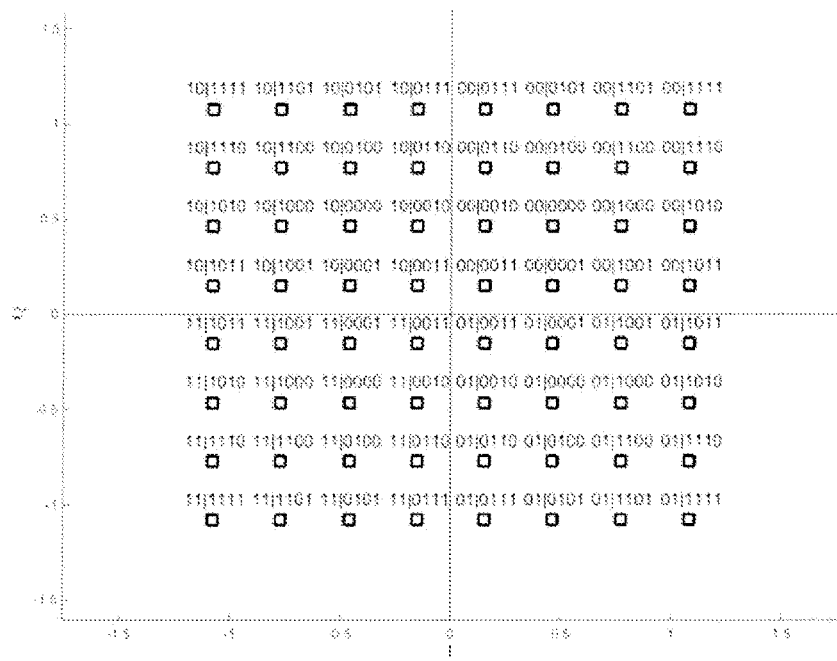

FIGS. 6A-6B show a different example where the radio network node 18 forms the hierarchically-modulated symbol 28 as a 64-QAM symbol. The node 18 performs concatenation 44 of 2 control data bits xx and 4 user data bits yyyy according to xx|yyyy, and performs a mapping 46 of the concatenated bits xx|yyyy into a 64-QAM symbol. The node 18 does so such that the control data bits xx are mapped onto one modulation layer (namely, the control-data modulation layer 30A) and the user data bits yyyy are mapped onto a different modulation layer (namely, the user-data modulation layer 30B). Specifically, as shown in FIG. 6B, the node 18 still maps concatenated bits xx|yyyy to symbols in the 64-QAM constellation such that different combinations of control data bits xx are mapped to different quadrants. And the node 18 maps concatenated bits xx|yyyy to symbols in the 64-QAM constellation such that different combinations of user data bits yyyy are mapped to different symbols within the same quadrant.

Figure 7:
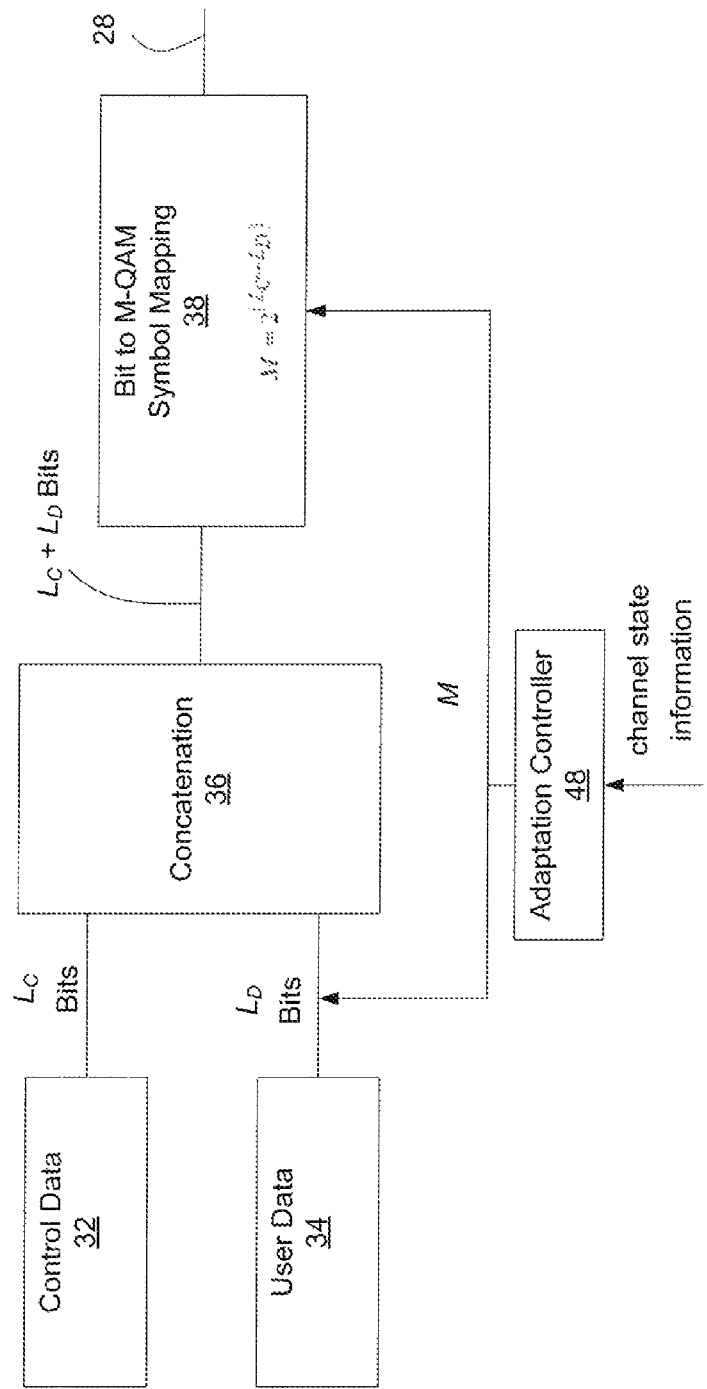
FIG. 7 is a block diagram of hierarchical modulation with dynamic adaptation of a higher order via which a user-data modulation layer is recoverable, according to one or more embodiments.

Notably, in at least some embodiments, the radio network node 18 dynamically adapts the higher order at which the user-data modulation layer 30B is to be demodulated for recovery, in dependence on conditions on the control channel 24 at the wireless communication device 16A. The radio network node 18 adapts this higher order to current channel conditions so as to improve the control channel's spectral efficiency. This translates to throughput gains, especially for cell-center devices. It can also be used to boost the throughput of cell-edge devices, by freeing some resources that cell-center and cell-edge devices usually share. Despite this higher order adaptation, the radio network node 18 still generally refrains from dynamically adapting the lower order at which the control-data modulation layer 30A is to be demodulated for recovery. That is, the node 18 generally statically fixes the lower order for recovery of the control data, e.g., to ensure control data robustness and minimize control data decoding complexity. For instance, in an LTE-based communication system, control data is always transmitted using a QPSK modulation order. FIG. 7 illustrates one such embodiment where the lower order used to modulate the control data is fixed.

As compared with FIG. 4, the radio network node 18 in FIG. 7 further includes an adaptation controller 48. The controller 48 obtains channel state information describing current conditions (e.g. signal to interference and noise ratio (SINR), path loss, channel quality indicator (CQI), error rate, etc.) on the control channel 24 at the wireless communication device 16A. The channel state information in some embodiments also accounts for historical conditions on the control channel 24. Regardless, based on this information, the controller 48 dynamically controls the modulation order M of symbol mapping 38 and the number of bits of user data 34, e.g., through signaling indicating the maximum modulation order M that can be supported by the current channel conditions. The controller 48 in this regard increases the modulation order M (e.g., to 64) when the information indicates improved channel conditions, but decreases the modulation order M (e.g., to 16) when the information indicates deteriorated channel conditions. Adapting M in this way amounts to adapting the higher order M at which the user-data modulation layer 30B is to be demodulated for recovery.

Even in the midst of dynamically adapting the higher order at which the user-data layer 30B is to be demodulated, the lower order at which the control-data modulation layer 30A is to be demodulated generally remains statically fixed, i.e., to $M_C$. In some embodiments, therefore, the radio network node 18 obtains the same number $L_C$ of bits of control data 32 (e.g., $L_C=2$) independent of conditions on the control channel 24 (given the statically fixed lower modulation order for control data), but dynamically adapts the number $L_D$ of bits of user data 34 obtained in dependence on conditions on the control channel 24. But, even though the lower order remains statically fixed, the bit error rate performance of lower order demodulation will prove similar to that of the higher order demodulation. This is because, for the same transmit power, the hierarchically-modulated symbol 28 has a lower minimum distance as compared to a non-hierarchically-modulated symbol conveying the control data alone, since the hierarchically-modulated symbol 28 has a higher order than the order that the non-hierarchically-modulated symbol would have. Accordingly, in at least some embodiments, the radio network node 18 only conveys control data to a device using hierarchical modulation if the current conditions on the control channel 24 at that device support the higher order. That is, the node 18 selectively performs the processing 100 in FIG. 2 responsive to dynamically determining that conditions on the control channel 24 at a device to which the control data is addressed support the higher order. Notably, the control data may therefore be conveyed to any device whose conditions on the control channel 24 support the higher order, provided that the device is of course configured to perform demodulation of the control channel 24 at the lower level.

With this in mind, the control data conveyed by the hierarchically-modulated symbol 28 is in some embodiments addressed to the same wireless communication device 16A to which the user data conveyed by the symbol 28 is addressed. The device 16A in some embodiments recovers the control data addressed to it by demodulating only the control-data modulation layer 30A at the lower order, and recovers the user data by demodulating at least the user-data modulation layer 30B at the higher order. Recovery of the user data may therefore involve either demodulating only the user-data modulation layer 30B at the higher order, or demodulating both the user-data modulation layer 30B and the control-data modulation layer at the higher order.

In embodiments where user data recovery involves demodulating only the user-data modulation layer 30B, the device 16A may effectively isolate the user-data modulation layer 30B from the control-data modulation layer 30A. For example, the device 16A in some embodiments realizes this isolation by obtaining the absolute value of the real and imaginary parts of the hierarchically-received symbol 28. Consider an example where the hierarchically-modulated symbol 28 is formed as shown in FIGS. 5A-5B, with the first two bits $b_1$, $b_2$ of the symbol 28 mapped to the control-data modulation layer 30A and the third and fourth bits $b_3$, $b_4$ of the symbol 28 mapped to the user-data modulation layer 30B. Assuming that the received complex 16-QAM symbol is represented as s, the third bit $b_3$ may be recovered to the exclusion of the other bits, by computing a soft value $c_3$ for the third bit as $$c_3 = |\text{real}(s)| - \frac{2}{\sqrt{10}}$$

and then making a hard decision for the third bit as $$b_3 = \begin{Bmatrix} 1, & c_3 \geq 0 \\ 0, & c_3 < 0 \end{Bmatrix}.$$

Similarly, the fourth bit $b_4$ may be recovered to the exclusion of the other bits, by computing a soft value $c_4$ for the fourth bit as $$c_4 = |\text{imag}(s)| - \frac{2}{\sqrt{10}}$$

and then making a hard decision for the fourth bit as $$b_4 = \begin{Bmatrix} 1, & c_4 \geq 0 \\ 0, & c_4 < 0 \end{Bmatrix}.$$

In embodiments where user data recovery involves demodulating both the control-data modulation layer 30A and the user-data modulation layer 30B, by contrast, the device 16A demodulates both layers 30A, 30B at the higher order, to obtain higher-order demodulated data. But the device 16A disregards a subset of the higher-order demodulated data (e.g., the first 2 bits xx) corresponding to the control-data modulation layer 30A. The device 16A then recovers the user data as a different subset of the higher-order demodulated data (e.g., the remaining bits yy) corresponding to the user-data modulation layer 30B.

Irrespective of how the device 16A recovers the user data to the exclusion of control data addressed to it, some embodiments exploit the control data as "in-band" control signaling that supports the hierarchical modulation approach herein. In some embodiments, for example, the control data indicates the higher order at which device 16A is to perform demodulation for recovery of the user data. The control data may advantageously do so as the higher order is dynamically adapted in dependence on conditions on the control channel 24 at the device 16A. Regardless, the higher order in some embodiments is the same order at which the device 16A is to demodulate symbols received over the data channel 26. In this case, the control data may implicitly indicate the higher order at which the device 16A is to demodulate the user-data modulation layer 30B of a symbol 28 received over the control channel 24, by explicitly indicating the order at which the device 16A is to demodulate symbols received over the data channel 26. Where the control data comprises DCI in LTE-based embodiments, for example, this approach avoids imposing changes to existing DCI formats that are already standardized.

In other embodiments, though, the higher order is permitted to be different from the order at which the device 16A is to demodulate any symbols received over the data channel 26. In this case, a DCI format may be defined with 2 additional bits to indicate whether M=4, 16, 64, or 256 for demodulating a user-data modulation layer 30B of a symbol 28 received over the control channel 24. These embodiments therefore require additional overhead as compared to embodiments that employ a common modulation order for user data on both the data channel 26 and the control channel 24. Yet such embodiments have the advantage of being flexible in assigning different modulation orders for the user data multiplexed in the control channel 24. This is useful since the control data is typically encoded with a less powerful channel encoding scheme than user data on the data channel 26, which means that the modulation order supported in user data multiplexed with the control channel 24 can be less than the order supported in the data channel 26. Also, if the conditions on the control channel 24 are more favorable than those on the data channel 26, the radio network node 18 may dynamically adapt the higher modulation order for the control channel 24 so that it is higher than the modulation order used for the data channel 26.

Additionally or alternatively, the control data may constitute control signaling that indicates on which transmission resources (e.g., resource elements, RE, in LTE) one or more hierarchically-modulated symbols are transmitted for conveying user data intended for the device 16A. The device 16A may therefore inspect the control data conveyed by a hierarchically-modulated symbol 28 in order to dynamically determine whether the symbol 28 (or some other symbol received over the control channel 24) conveys user data intended for that device 16A. Where the control data comprises DCI in LTE-based embodiments, for example, the control data may fully specify resource elements on which hierarchically-modulated symbols are transmitted (i.e., multiplexed resource elements, MREs) by three fields: (1) isePDCCH, which equals 0 if the MREs are part of the PDCCH and 1 if they are part of the ePDCCH; (2) Index, which is a control channel element (CCE) index for the case of PDCCH or an eCCE for the case of ePDCCH; and (3) Number, which is the number of CCEs or eCCEs aggregated for the PDCCH or ePDCCH. Regardless, responsive to determining that the symbol 28 does indeed convey user data for the device 16A as well, the device 16A may demodulate at least the user-data modulation layer 30B at the higher order.

Alternatively to the above "overhead" control signaling being conveyed as part of the control data on the control channel 24, the signaling may comprise (semi-static) signaling that is transmitted on a time basis slower than that on which the control channel 24 is transmitted. This signaling may be for instance medium access control (MAC) or radio resource control (RRC) signaling. The slower time scale of these embodiments, though, slows the dynamic nature with which the higher order may be dynamically adapted. As yet another alternative, therefore, the "overhead" signaling for multiplexing user data onto a symbol 28 conveyed on the control channel 24 may be conveyed on a different modulation symbol over a different control channel (not shown). That is, the device 16A may recover control data conveyed on a different symbol (which may or may not be hierarchically-modulated) over a different control channel, and use that control data to recover the user data conveyed on control channel 24 (i.e., by identifying the symbol 28 as having user data intended for the device 16A and/or by identifying the higher order with which the symbol's user-data modulation layer 30B is to be demodulated).

As suggested by this latter embodiment, therefore, the control data conveyed by the hierarchically-modulated symbol 28 is in some embodiments addressed to a different wireless communication device 16B than the wireless communication device 16A to which the user data conveyed by the symbol 28 is addressed. That is, the radio network node 18 exploits hierarchical-modulation to realize multi-user multiplexing of the control data and the user data, for demodulation at different orders.

In one or more embodiments, the radio network node 18 dynamically pairs the wireless communication devices 16A, 16B for hierarchical modulation of the user data and control data respectively addressed to those devices. The radio network node 18 in some embodiments does so by evaluating on a transmission interval by transmission interval basis (e.g., TTI by TTI in LTE) different possible pairings of devices whose conditions on the control channel 24 support the higher order. In view of this evaluation, the node 18 selects the pairing of devices 16A, 16B from the different possible pairings based on maximizing a defined utility metric. The maximized metric may for instance reflect system capacity. In some embodiments, for example, the metric characterizes capacity gained by a possible pairing relative to an overhead required for that possible pairing. The metric may quantify this capacity gain vs. required overhead in the form of the total number of bits conveyed by a hierarchically-modulated symbol minus the size of any overhead required for realizing the hierarchical modulation (e.g., including for instance control signaling for signaling the higher order as it is dynamically adapted to channel conditions). The pairing is in any event determined differently in some embodiments depending on whether or not the user data buffer at the radio network node 18 is full. If the buffer is full, the node 18 may aim for the optimal pairing solution, whereas if the buffer is not full, the node 18 may aim for a suboptimal pairing solution that is of less complexity.

A special case may nonetheless occur if there are symbols (e.g., in the LTE control region) that are not assigned to any device. For instance, this situation may happen in any transmission interval where the number of devices to receive downlink control data is very small. In this case, a dummy device is assigned to the symbol, and dummy control data is transmitted (e.g., all zeros). The dummy device is assumed to support the highest modulation order possible. The wireless communication device 16A may be paired with this dummy device. The dummy control data will not be decoded by any real device, and it may be ignored by the device 16A receiving the user data.

Regardless of the particular way that the pairing is accomplished, the device 16A to which the user data is addressed may advantageously be paired with another so-called "legacy" device 16B that is not capable of or otherwise configured for receiving hierarchically-modulated symbols 28 over the control channel 24. This means that the user-data modulation layer 30B is transparent to the legacy device 16B, such that from the perspective of the legacy device 16B the control channel 24 appears reserved exclusively for conveying control data (i.e., not user data). The legacy device 16B therefore is just configured to exclusively recover control data conveyed over the control channel 24 by only demodulating symbols received over the control channel 24 at the lower order, even when conditions on the control channel 24 at the legacy device 16B support demodulation at the higher order. Recovery of the control data via lower order demodulation in this way remains unaffected by the fact that user data is multiplexed onto the control channel 24, except that as mentioned above the bit error performance resembles that of high order demodulation. This proves advantageous, for example, in a system 10 where control data messages (i.e., DCI messages) conveyed over the control channel 24 must be blindly decoded. Maintaining lower order demodulation for recovery of blindly decoded control data messages not only preserves backwards compatibility with legacy devices but also preserves lower blind decoding complexity.

Specifically in this regard, a wireless communication device 16A or 16B may recover the control data (e.g., DCI) from the hierarchically-modulated symbol 28, by demodulating the control-data modulation layer 30A at the lower order. A device 16A that is configured for receiving user data over a hierarchically-modulated symbol 28 may thereby decide to demodulate at the lower order (e.g., using QPSK), despite knowing that the symbol 28 is indeed a higher order symbol (e.g., 16-QAM symbol). A legacy device 16B having no knowledge of the hierarchical nature of symbol 28 may "ignorantly" demodulate at the lower order, not knowing that symbol 28 is actually a higher order symbol. The legacy device 16B thereby only recovers user data from the data channel 26, not the control channel 24.

Regardless, having demodulated at the lower order, the device 16A or 16B in some embodiments attempts to blindly decode a control data message (e.g., DCI message) formed at least in part from the recovered control data. The complexity of these blind decoding attempts advantageously remains low by statically fixing the modulation order via which the control data is recovered. This notably remains the case even in embodiments where the system 10 dynamically adapts the modulation order via which the user data is recovered, to maximize the spectral efficiency of the control channel 24. Regardless, in one or more embodiments, the device 16A or 16B then determines whether the control data message is addressed to the device 16A or 16B, based on whether that attempt to blindly decode the message succeeds.

Figure 8:
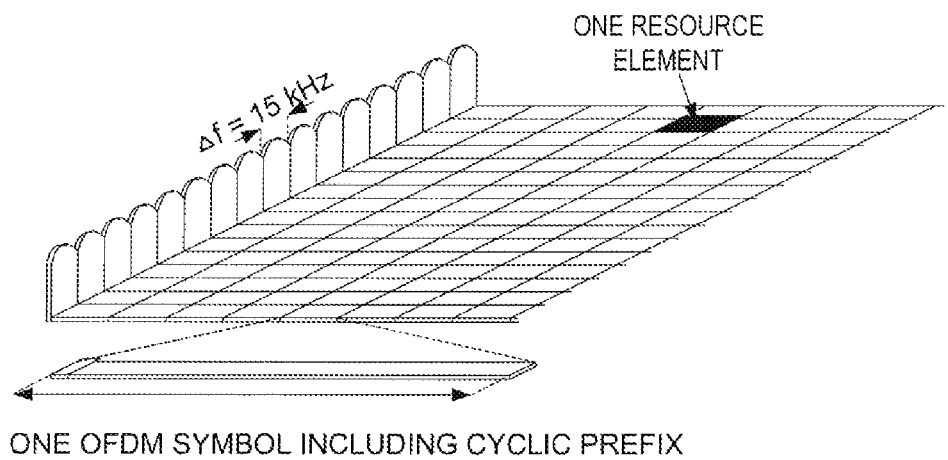
FIG. 8 is a block diagram of a time-frequency grid according to one or more LTE-based embodiments.

Consider now particular embodiments where the system 10 is or evolves from LTE. LTE uses OFDM in the downlink and Discrete Fourier Transform (DFT)-spread OFDM in the uplink. The basic LTE downlink physical resource can thus be seen as a time-frequency grid as illustrated in FIG. 8, where each resource element corresponds to one OFDM subcarrier during one OFDM symbol interval.

Figure 9:
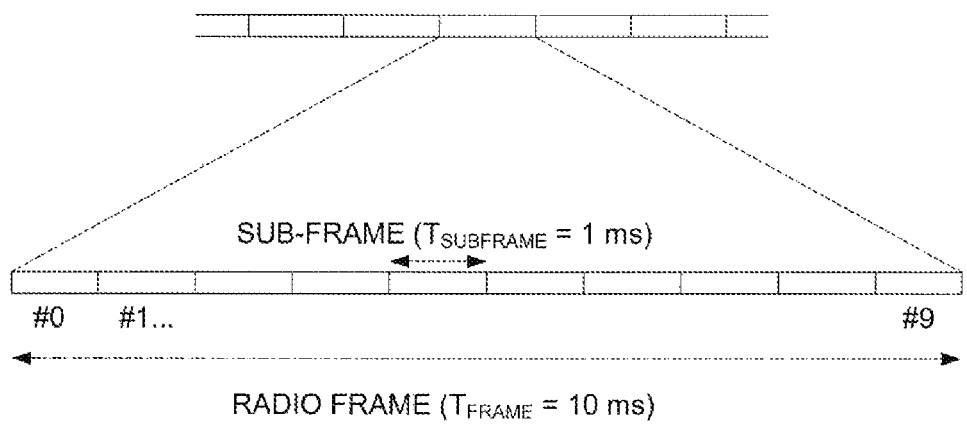
FIG. 9 is a block diagram of a frame structure according to one or more LTE-based embodiments.

As shown in FIG. 9, in the time domain, LTE downlink transmissions are organized into radio frames of 10 ms, each radio frame consisting of ten equally-sized subframes of length $T_{subframe}=1$ ms.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control data in the form of DCI indicating to which UEs data is transmitted over the PDSCH and upon which resource blocks the data is transmitted, in the current downlink subframe. The DCI may include for instance downlink scheduling assignments in the form of PDSCH resource indications, transport format, hybrid-ARQ information, and control information related to spatial multiplexing (if applicable). The DCI may also include a command for power control of the physical uplink control channel (PUCCH) used for transmission of hybrid-ARQ acknowledgements in response to downlink scheduling assignments. The DCI may further include uplink scheduling grants and power-control commands. The different types of control information correspond to different DCI message sizes, categorized into different DCI formats.

Figure 10:
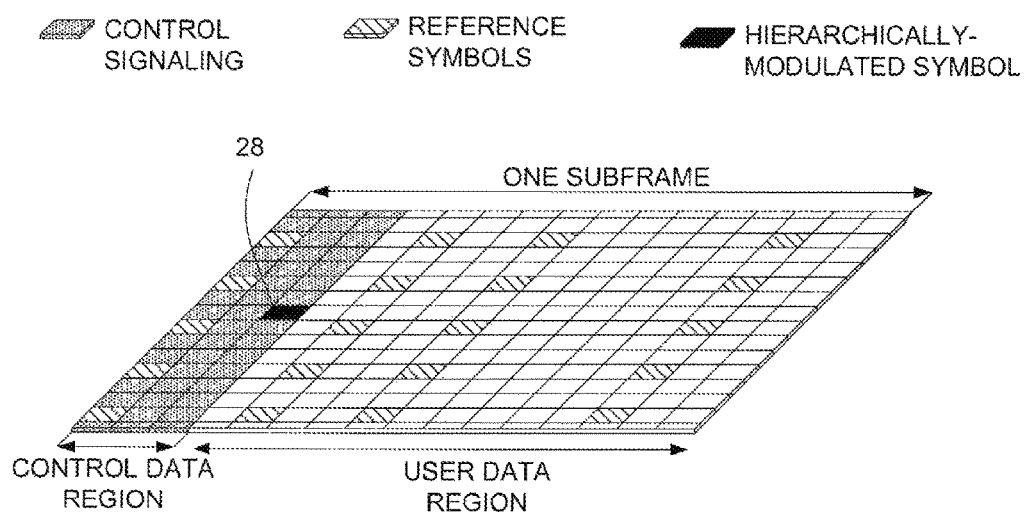
FIG. 10 is a block diagram of a subframe structure with user data multiplexed onto a control region according to one or more embodiments.

A DCI message may be transmitted over the PDCCH in the first 1, 2, or 3 OFDM symbols in each subframe under certain conditions (e.g., for bandwidths that accommodate more than 10 resource blocks), or over the first 2, 3, or 4 OFDM symbols in each subframe under other conditions (e.g., for bandwidths that accommodate less than 10 resource blocks). The region over which the PDCCH extends is designated as the control region. The number n=1, 2, 3 or 4 is known as the Control Format Indicator (CFI). A system with CFI=3 OFDM symbols as control is illustrated in FIG. 10. One PDCCH carries one DCI message with one of the different possible DCI formats. A cyclic redundancy check (CRC) is attached to each DCI message payload. The identity of the UE (or UEs) addressed—that is, the radio network temporary identifier (RNTI)—is included in the CRC calculation. Upon reception of DCI, a UE will check the CRC using its set of assigned RNTIs. If the CRC checks, the message is declared to be correctly received and intended for the UE. Thus, the identity of the UE to which a DCI message is addressed is implicitly encoded in the CRC and not explicitly transmitted. This reduces the amount of bits necessary to transmit on the PDCCH.

As multiple UEs can be scheduled simultaneously, requiring multiple downlink scheduling messages within each subframe, each scheduling message is transmitted on a separate PDCCH. Consequently, there are typically multiple simultaneous PDCCH transmissions conveying multiple different DCI messages. Since a UE does not know a priori the precise location of the DCI message(s) intended to it in a subframe, the UE must rely on blind decoding, where the UE searches the potential parts of the subframe where its DCI message(s), if any, may be transmitted.

To allow for simple yet efficient processing of PDCCH in the UE, the mapping of PDCCHs to resource elements is subject to a certain structure. This structure is based on so-called control channel elements (CCEs), which in essence is a convenient name for a set of 36 useful resource elements (nine resource-element groups). The number of CCEs, one, two, four, or eight, required for a certain PDCCH depends on the payload size of the control data (DCI payload) and the channel-coding rate. This number of CCEs is referred to as the aggregation level. As the number of CCEs for each of the PDCCHs may vary and is not signaled, the UE has to blindly determine the number of CCEs used for the PDCCH it is addressed upon. To reduce the complexity of this process somewhat, certain restrictions on the aggregation of contiguous CCEs have been specified and define search spaces that the UE's search are constrained to. A search space is therefore a set of candidate PDCCHs formed by CCEs on a given aggregation level, which the UE is supposed to attempt to decode. As there are multiple aggregation levels, corresponding to one, two, four, and eight CCEs, a UE has multiple search spaces. In each subframe, a UE will attempt to decode all the PDCCHs that can be formed from the CCEs in each of its search spaces. If the CRC checks, the content of the PDCCH is declared as valid for the UE and the UE processes the DCI.

Notably, at least some embodiments multiplex user data over the control data in the control region of FIG. 10, by transmitting a hierarchically-modulated symbol 28 on a PDCCH within that control region. Although not shown, other embodiments multiplex user data over control data within the user data region of FIG. 10, by transmitting a hierarchically-modulated symbol on an enhanced PDCCH (ePDCCH) within that user data region.

Figure 11:
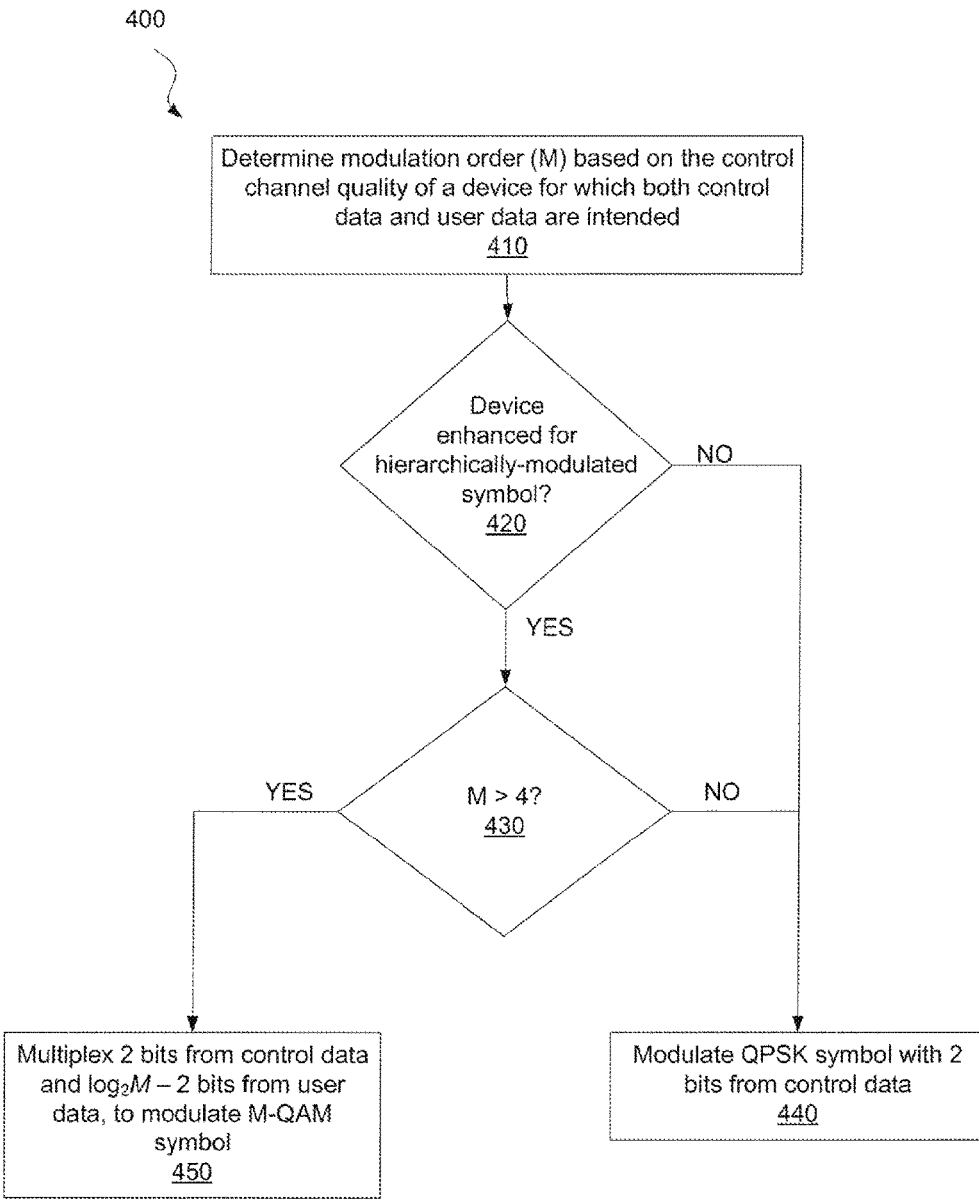
FIG. 11 is a logic flow diagram of processing performed by a radio network node for hierarchical modulation of control data and user data intended for the same wireless communication device, according to one or more embodiments.
Figure 12:
FIG. 12 is a logic flow diagram of processing performed by a wireless communication device for receiving a hierarchically-modulated symbol conveying control data and user data intended for the same wireless communication device, according to one or more embodiments.
Figure 13:
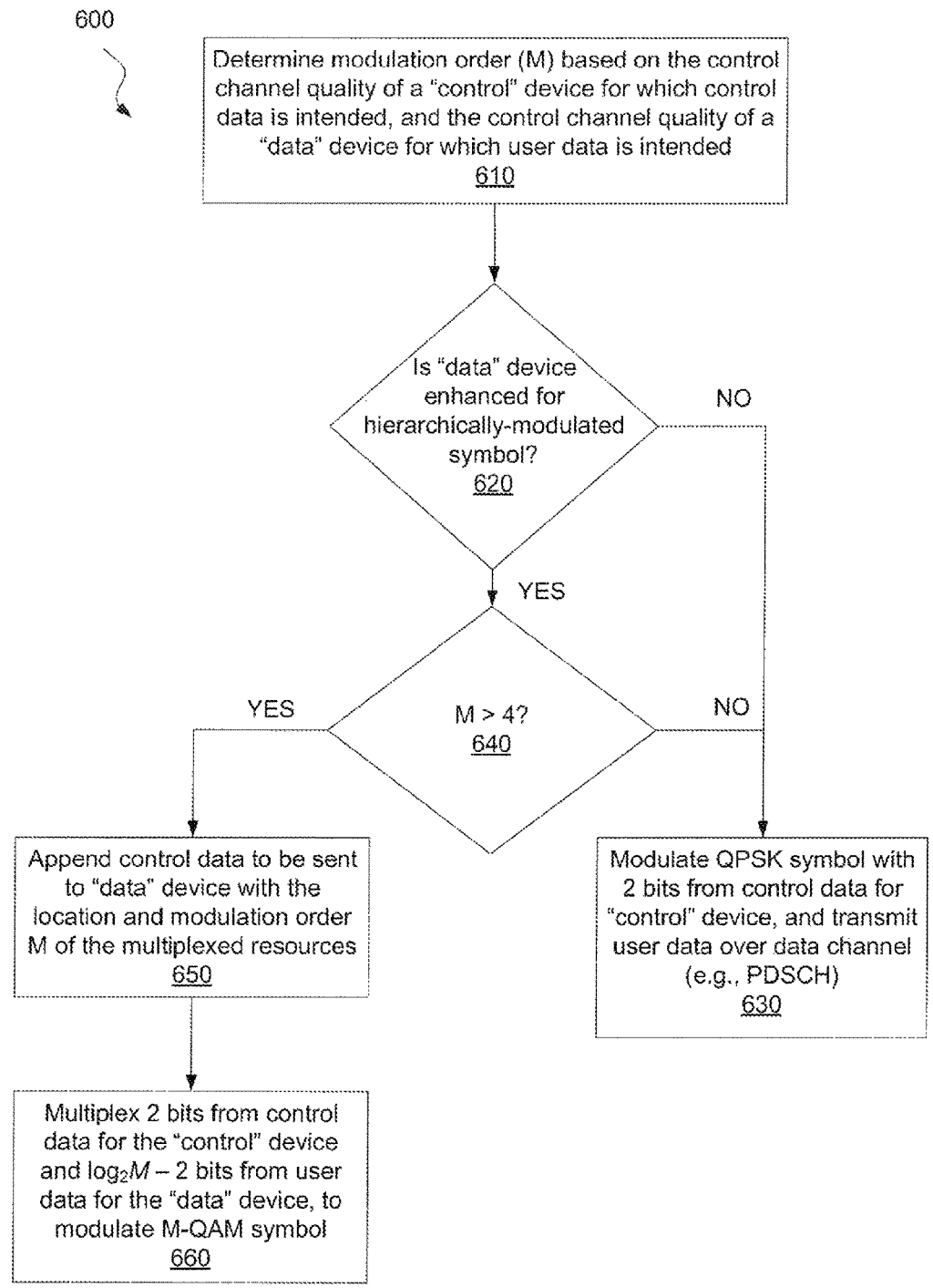
FIG. 13 is a logic flow diagram of processing performed by a radio network node for hierarchical modulation of control data and user data intended for different wireless communication devices, according to one or more embodiments.
Figure 14:
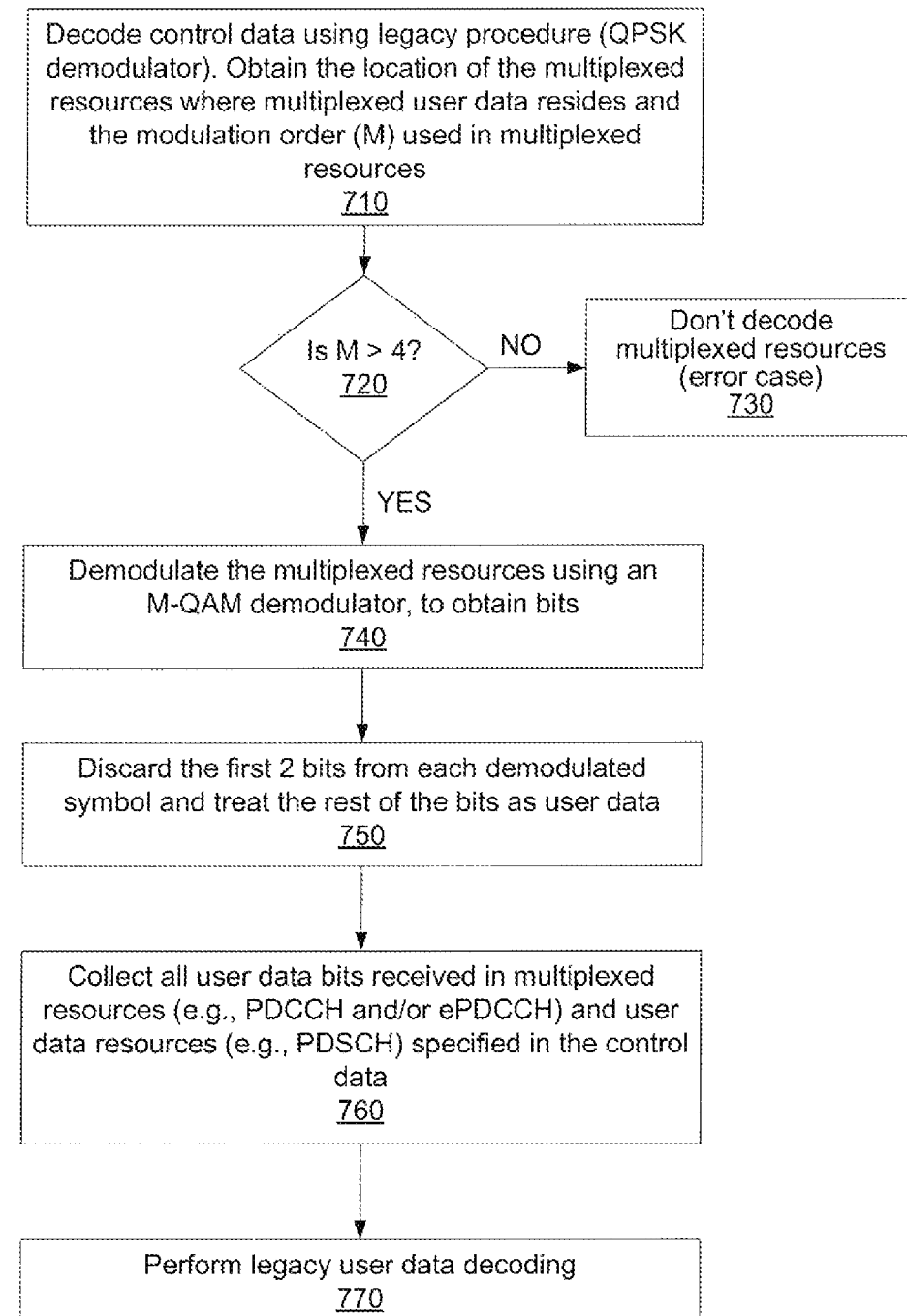
FIG. 14 is a logic flow diagram of processing performed by a wireless communication device for receiving a hierarchically-modulated symbol conveying control data and user data intended for different wireless communication devices, according to one or more embodiments.

FIGS. 11-14 illustrate details of processing performed by a radio network node 18 and a wireless communication device 16A according to certain embodiments. In one or more of these embodiments, the system 10 is or evolves from LTE, such that control data comprises DCI and that DCI is recoverable via QPSK demodulation. FIGS. 11-12 concern embodiments where the control data and the user data conveyed by a hierarchically-modulated symbol 28 are intended for the same wireless communication device 16A (referred to in LTE parlance as a user equipment, UE). FIGS. 13-14 by contrast concern embodiments where the control data is intended for a device 16B different than the device 16A to which the user data is intended.

As shown in FIG. 11, a radio network node 18 (e.g., enhanced NodeB) performs processing 400 that includes determining the modulation order M of a hierarchically-modulated symbol 28 (Block 410). The node 18 determines the modulation order M based on the control channel quality of a device 16A (e.g., UE) to be scheduled. If this device 16A is not enhanced for receiving a hierarchically-modulated symbol 28 (NO at Block 420), though, the node 18 modulates a QPSK symbol with 2 bits from the control data (e.g., DCI) (Block 440), rather than conveying that control data with a hierarchically-modulated symbol 28. However, if the device 16A is indeed enhanced in this way (YES at Block 420), the node 18 determines whether the modulation order M is greater than 4 (Block 430). If the modulation order is not greater than 4, the node 18 does not perform hierarchical modulation for that device 16A. Instead, the node 18 modulates a QPSK symbol with 2 bits from the control data (Block 440) and conveys any user data for the device 16A over the data channel (e.g., PDSCH user data). On the other hand, if the modulation order is greater than 4 (YES at Block 430), the node 18 multiplexes 2 bits of the control data (e.g., DCI) and $\log_2 M - 2$ bits of user data (e.g., PDSCH), to modulate a M-QAM symbol intended for the device 16A (Block 450).

FIG. 12 illustrates corresponding processing 500 at the device 16A. This processing 500 includes (blind) decoding control data (e.g., DCI) recovered from a received multiplexed resource (e.g., MRE) using the legacy procedure; that is, using a QPSK demodulator (Block 510). Assuming this decoding succeeds, the device 16A obtains the modulation order M from this decoded control data (Block 510). If the modulation order M is not greater than 4 (NO at Block 520), the device 16A performs legacy user data decoding from resources (e.g., PDSCH REs) specified in the control data (Block 530). However, if the modulation order M is greater than 4 (YES at Block 520), the device 16A re-demodulates the multiplexed resource (and any other multiplexed resources indicated by the control data) using an M-QAM demodulator, to obtain bits (Block 540). The device 16A however discards the first 2 bits from each symbol and treats the rest of the bits as user data (Block 550). The device 16A collects all user data bits received in multiplexed resources (e.g., PDCCH and/or ePDCCH MREs) and user data resources from the data channel 26 (e.g., PDSCH REs) specified in the control data (Block 560). The device 16A then performs legacy user data decoding (Block 570).

In FIG. 13, by contrast, the control data and user data are intended for different devices 16A, 16B. As shown, processing 600 at the radio network node 18 in this case comprises determining the modulation order M based on the control channel quality of a "control" device 16B for which the control data (e.g., DCI) is intended, and the control channel quality of a "data" device 16A for which user data (e.g., PDSCH user data) is intended (Block 610). The node 18 may for instance determine the modulation order M for the hierarchically-modulated symbol 28 to be less than or equal to the modulation order supported by control channel conditions at the control device 16B, and the modulation order supported by control channel conditions at the data device 16A. Regardless, processing 600 further includes determining if the "data" device 16A is enhanced for receiving a hierarchically-modulated symbol 28 (Block 620). If not, the node 18 modulates a QPSK symbol with 2 bits from the control data (e.g., DCI) for the "control" device 16B, and transmits user data (e.g., PDSCH user data) for the "data" device 16A over the data channel (e.g., PDSCH) (Block 630).

If the "data" device 16A is indeed enhanced, though, the node 18 appends control data to be conveyed to the "data" device 16A in a resource or multiplexed resource. This appended control data indicates the location and modulation order M of the multiplexed resources (Block 650). The node 18 also determines whether the modulation order M is greater than 4 (Block 640). If so, the node 18 multiplexes 2 bits of control data (e.g., DCI) and $\log_2 M-2$ bits from user data, to modulate a M-QAM symbol intended for reception by both the "control" device 16B and the "data" device 16A (Block 660).

FIG. 14 illustrates corresponding processing 700 performed by the "data" device 16A. As shown, processing 700 includes (blind) decoding control data (e.g., DCI) recovered from a received resource or multiplexed resource using the legacy procedure; that is, using a QPSK demodulator (Block 710). Assuming this decoding succeeds, the device 16A obtains the location of the multiplexed resources where multiplexed user data resides and the modulation order M used in multiplexed resources (Block 710). If the modulation order M is not greater than 4 (NO at Block 520), the device 16A performs legacy user data decoding from resources (e.g., PDSCH REs) but does not decode multiplexed resources (Block 730). However, if the modulation order M is greater than 4 (YES at Block 720), the device 16A demodulates the multiplexed resources whose location was indicated by the control data using an M-QAM demodulator, to obtain bits (Block 740). The device 16A however discards the first 2 bits from each symbol and treats the rest of the bits as user data (e.g., PDSCH user data) (Block 750). The device 16A collects all user data bits received in multiplexed resources (e.g., PDCCH and/or ePDCCH MREs) and user data resources (e.g., PDSCH REs) specified in the control data (Block 760). The device 16A then performs legacy user data decoding (Block 770).

Figure 15:
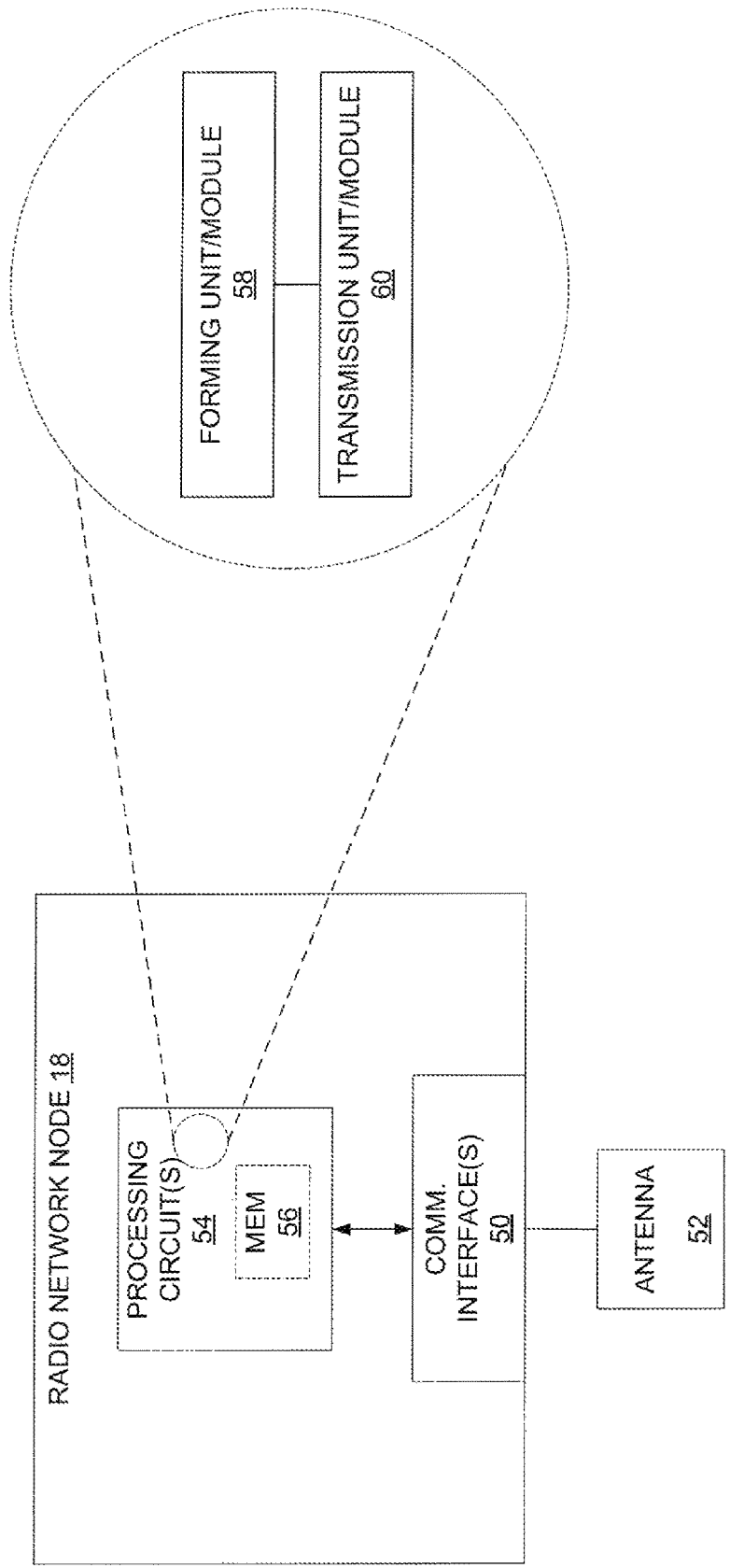
FIG. 15 is a block diagram of a radio network node according to one or more embodiments.

In view of the various modifications and variations herein, those skilled in the art will appreciate that a radio network node 18 herein is configured to perform the processing herein (e.g., as shown in FIG. 2) via any functional means or units. FIG. 15 illustrates one example radio network node 18 (e.g., a base station such as an eNodeB in LTE-based systems) in this regard. The radio network node 18 comprises one or more communication interfaces 50 for communicating with a wireless communication device 16A via an antenna 52. The one or more communication interfaces 50 may also interface with other nodes in the system. For communicating with the device 16A, though, the interface(s) 50 may include transceiver circuits that, for example, comprise transmitter circuits and receiver circuits that operate according to LTE or other known standards.

The radio network node 18 also comprises processing circuits 54, which may comprise one or more processors, hardware circuits (e.g. application-specific integrated circuit (ASIC), field-programmable gate array (FPGA), etc.), firmware, or a combination thereof. These processing circuits 54 in some embodiments operate in conjunction with memory 56 that stores instructions executed by one or more processors of the processing circuits 54. Memory 56 may comprise one or more volatile and/or non-volatile memory devices. Program code for controlling operation of the radio network node 18 is in some embodiments stored in a non-volatile memory, such as a read-only memory or flash memory. Temporary data generated during operation may be stored in random access memory. The program code stored in memory, when executed by the processing circuit(s) 54, causes the processing circuit(s) 54 to perform the methods described above in relation with the radio network node 18.

FIG. 15 illustrates the main functional components of the processing circuit(s) 54 according to different embodiments. In one exemplary embodiment, the functional components include a forming unit or module 58 for forming the hierarchically-modulated symbol 28, and a transmission unit or module 60 for transmitting that symbol 28. In one embodiment, these units or modules each comprise a programmable circuit that is configured by program code stored in memory to perform their respective functions. In other embodiments, one or more of the functional components may be implemented, in whole or in part, by hardware circuits.

Figure 16:
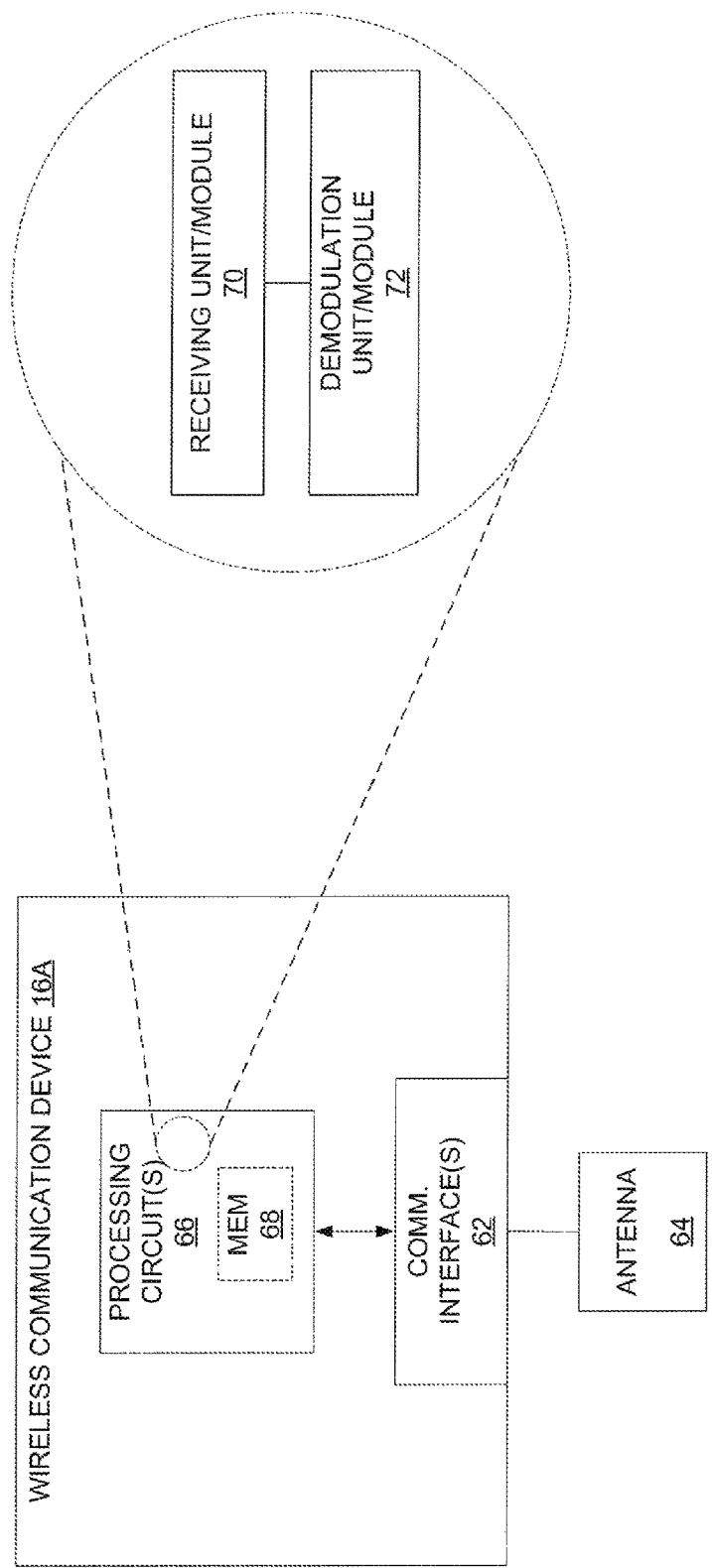
FIG. 16 is a block diagram of a wireless communication device according to one or more embodiments.

Also in view of the various modifications and variations herein, those skilled in the art will appreciate that a wireless communication device 16A herein is configured to perform the processing herein (e.g., as shown in FIG. 3) via any functional means or units. FIG. 16 illustrates one example wireless communication device 16A (e.g., a UE in LTE-based systems) in this regard. The device 16A comprises one or more communication interfaces 62 for communicating with one or more radio network nodes 18 via an antenna 64. The one or more communication interfaces 62 may include transceiver circuits that, for example, comprise transmitter circuits and receiver circuits that operate according to LTE or other known standards.

The wireless communication device 16A also comprises processing circuits 66, which may comprise one or more processors, hardware circuits (e.g. application-specific integrated circuit (ASIC), field-programmable gate array (FPGA), etc.), firmware, or a combination thereof. These processing circuits 66 in some embodiments operate in conjunction with memory 68 that stores instructions executed by one or more processors of the processing circuits 66. Memory 68 may comprise one or more volatile and/or non-volatile memory devices. Program code for controlling operation of the wireless communication device 16A is in some embodiments stored in a non-volatile memory, such as a read-only memory or flash memory. Temporary data generated during operation may be stored in random access memory. The program code stored in memory, when executed by the processing circuit(s) 66, causes the processing circuit(s) 66 to perform the methods described above in relation to the wireless communication device 16A.

FIG. 16 illustrates the main functional components of the processing circuit(s) 66 according to different embodiments. In one exemplary embodiment, the functional components include a receiving unit or module 70 for receiving the hierarchically-modulated symbol 28, and a demodulation unit or module 72 for recovering user data conveyed by that symbol 28. In one embodiment, these units or modules each comprise a programmable circuit that is configured by program code stored in memory to perform their respective functions. In other embodiments, one or more of the functional components may be implemented, in whole or in part, by hardware circuits.

Embodiments herein also include a computer program comprising instructions which, when executed by at least one processor of a radio node 16A, 18, causes the radio node to carry out any of the methods herein. In one or more embodiments, a carrier containing the computer program is one of an electronic signal, optical signal, radio signal, or computer readable storage medium.

Those skilled in the art will of course understand that the control data and user data referred to herein may be coded, rate matched, scrambled, or otherwise conditioned for reliable transmission and reception over the control channel 24 and data channel 26, respectively. In LTE-based embodiments, for instance, DCI as the control data may be appended with a cyclic redundancy check (CRC), channel-coded, rate matched, and scrambled prior to modulation.

Those skilled in the art will also appreciate that the embodiments herein are equally applicable to RANs and UEs implementing any access technology and standard. This remains the case even though various embodiments have been described within the context of LTE. LTE is therefore used as just an example for understanding the problems and solutions herein and should not be seen as limiting.

Those skilled in the art will further appreciate that "wireless communication device" is a non-limiting term comprising any device equipped with a wireless interface allowing for receiving wireless signals from a radio network node. Some examples of a wireless communication device in a general sense are a user equipment (UE), a laptop, a mobile terminal, a machine-to-machine (M2M) device, a device capable of device-to-device (D2D) communication, a fixed relay, mobile relay, a radio network node equipped with a UE-like interface (e.g., an location measurement unit, LMU), a femto base station or a small base station using the terminal technology). A wireless communication device herein may be capable of operating in one or more frequencies, carrier frequencies, component carriers or frequency bands. The device may operate in single- or multi-RAT or multi-standard mode (e.g., an example dual-mode device may operate with any one or combination of WiFi and LTE).

A radio network node is a non-limiting term comprises any node comprised in a radio network (e.g., an LTE RAN) that at least transmits radio signals to one or more wireless communication devices. Some examples of a radio network node include a radio base station (e.g., eNodeB in LTE or NodeB in UTRAN), a relay, a mobile relay, a remote radio unit (RRU), a remote radio head (RRH), a sensor, a beacon device, a measurement unit (e.g., LMUs), user terminal, mobile terminal, laptop, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a wireless communication device for receiving user data from a radio network node in a wireless communication system that includes a data channel over which user data is transmitted and a control channel over which control data is transmitted, the method comprising:

receiving over the control channel a hierarchically-modulated symbol which conveys control data on a control-data modulation layer that is recoverable via demodulation at a lower order, and conveys user data on a user-data modulation layer that is recoverable via demodulation at a higher order, wherein the lower order is lower than the higher order and is predefined independent of conditions on the control channel, and the higher order is dynamically adapted in dependence on conditions on the control channel at the wireless communication device; and recovering the user data received over the control channel by:
    demodulating both the user-data modulation layer and the control-data modulation layer at the higher order, to obtain higher-order demodulated data;
    disregarding a subset of the higher-order demodulated data corresponding to the control-data modulation layer; and
    recovering the user data as a different subset of the higher order demodulated data corresponding to the user-data modulation layer.

2. The method of claim 1, further comprising dynamically determining the higher order from received control signaling that indicates the higher order.

3. The method of claim 1, further comprising performing said demodulating responsive to dynamically determining that the hierarchically-modulated symbol conveys user data intended for the wireless communication device, based on received control signaling that indicates on which transmission resources one or more hierarchically-modulated symbols are transmitted for conveying user data intended for the wireless communication device.

4. The method of claim 1, further comprising recovering the control data by demodulating the control-data modulation layer at the lower order.

5. The method of claim 4, further comprising attempting to blindly decode a control data message formed at least in part from the recovered control data, and determining whether the control data message is addressed to the wireless communication device based on whether the attempting to blindly decode the control data message succeeds.

6. The method of claim 1, wherein the control data conveyed by the hierarchically-modulated symbol is addressed to a different wireless communication device than the wireless communication device to which the user data is addressed.

7. The method of claim 6, wherein from the perspective of the different wireless communication device the control channel is reserved exclusively for conveying control data, the different wireless communication device being configured to exclusively recover control data conveyed over the control channel by only demodulating symbols received over the control channel at the lower order, even when conditions on the control channel at the different wireless communication device support demodulation at the higher order.

8. The method of claim 1, wherein control signaling from the radio network node to the wireless communication device indicates the higher order, indicates on which transmission resources one or more hierarchically-modulated symbols are transmitted for conveying user data intended for the wireless communication device, or indicates both, and wherein the control signaling comprises the control data conveyed by the hierarchically-modulated symbol.

9. The method of claim 1, wherein the radio network node also transmits user data to the wireless communication device over the data channel.

10. The method of claim 1, wherein the wireless communication system is or evolves from a Long Term Evolution, LTE, system, wherein the control channel is a Physical Downlink Control Channel, PDCCH, or an enhanced Physical Downlink Control Channel, ePDCCH, and wherein the control data is Downlink Control Information.

11. A method implemented by a radio network node for transmitting user data to a wireless communication device in a wireless communication system that includes a data channel over which user data is transmitted and a control channel over which control data is transmitted, the method comprising:
- transmitting user data to the wireless communication device or a different wireless communication device over the data channel;
- forming a hierarchically-modulated symbol which conveys control data on a control-data modulation layer that is recoverable via demodulation at a lower order, and conveys user data on a user-data modulation layer that is recoverable via demodulation at a higher order, wherein the lower order is lower than the higher order and is predefined independent of conditions on the control channel, and the higher order is dynamically adapted in dependence on conditions on the control channel at the wireless communication device; and
- transmitting the hierarchically-modulated symbol to the wireless communication device over the control channel to enable the wireless communication device to recover the user data by:
  - demodulating both the user-data modulation layer and the control-data modulation layer at the higher order, to obtain higher-order demodulated data;
  - disregarding a subset of the higher-order demodulated data corresponding to the control-data modulation layer; and
  - recovering the user data as a different subset of the higher order demodulated data corresponding to the user-data modulation layer.

12. The method of claim 11, further comprising dynamically determining that conditions on the control channel at a wireless communication device to which the control data is addressed support the higher order, and performing said forming and transmitting responsive to that determination.

13. The method of claim 11, further comprising dynamically pairing the wireless communication device with a different wireless communication device for hierarchical modulation of the user data and control data respectively addressed to the devices, by evaluating on a transmission interval by transmission interval basis different possible pairings of wireless communication devices whose conditions on the control channel support the higher order and selecting said pairing from the different possible pairings based on maximizing a defined utility metric.

14. The method of claim 13, wherein the defined utility metric characterizes capacity gained by a possible pairing relative to an overhead required for that possible pairing.

15. The method of claim 11, wherein the control data conveyed by the hierarchically-modulated symbol is addressed to a different wireless communication device than the wireless communication device to which the user data is addressed.

16. The method of claim 15, wherein from the perspective of the different wireless communication device the control channel is reserved exclusively for conveying control data, the different wireless communication device being configured to exclusively recover control data conveyed over the control channel by only demodulating symbols received over the control channel at the lower order, even when conditions on the control channel at the different wireless communication device support demodulation at the higher order.

17. The method of claim 11, wherein control signaling from the radio network node to the wireless communication device indicates the higher order.

18. The method of claim 11, wherein control signaling from the radio network node to the wireless communication device indicates on which transmission resources one or more hierarchically-modulated symbols are transmitted for conveying user data intended for the wireless communication device.

19. The method of claim 11, wherein control signaling from the radio network node to the wireless communication device indicates the higher order, indicates on which transmission resources one or more hierarchically-modulated symbols are transmitted for conveying user data intended for the wireless communication device, or indicates both, and wherein the control signaling comprises the control data conveyed by the hierarchically-modulated symbol.

20. The method of claim 11, wherein the wireless communication system is or evolves from a Long Term Evolution, LTE, system, wherein the control channel is a Physical Downlink Control Channel, PDCCH, or an enhanced Physical Downlink Control Channel, ePDCCH, and wherein the control data is Downlink Control Information.

21. A wireless communication device for receiving user data from a radio network node in a wireless communication system that includes a data channel over which user data is transmitted and a control channel over which control data is transmitted, the wireless communication device comprising:
- a receiving circuit configured to receive over the control channel a hierarchically-modulated symbol which conveys control data on a control-data modulation layer that is recoverable via demodulation at a lower order, and conveys user data on a user-data modulation layer that is recoverable via demodulation at a higher order, wherein the lower order is lower than the higher order and is predefined independent of conditions on the control channel, and the higher order is dynamically adapted in dependence on conditions on the control channel at the wireless communication device; and
- a demodulation circuit configured to recover the user data received over the control channel by:
  - demodulating both the user-data modulation layer and the control-data modulation layer at the higher order, to obtain higher-order demodulated data;
  - disregarding a subset of the higher-order demodulated data corresponding to the control-data modulation layer; and
  - recovering the user data as a different subset of the higher order demodulated data corresponding to the user-data modulation layer.

22. The wireless communication device of claim 21, wherein the demodulation circuit is configured to dynamically determine the higher order from received control signaling that indicates the higher order.

23. The wireless communication device of claim 21, wherein the demodulation circuit is configured to perform said demodulating responsive to dynamically determining that the hierarchically-modulated symbol conveys user data intended for the wireless communication device, based on received control signaling that indicates on which transmission resources one or more hierarchically-modulated symbols are transmitted for conveying user data intended for the wireless communication device.

24. The wireless communication device of claim 21, wherein the control data conveyed by the hierarchically-modulated symbol is addressed to a different wireless communication device than the wireless communication device to which the user data is addressed.

25. The wireless communication device of claim 24, wherein from the perspective of the different wireless communication device the control channel is reserved exclusively for conveying control data, the different wireless communication device being configured to exclusively recover control data conveyed over the control channel by only demodulating symbols received over the control channel at the lower order, even when conditions on the control channel at the different wireless communication device support demodulation at the higher order.

26. The wireless communication device of claim 21, wherein the wireless communication system is or evolves from a Long Term Evolution, LTE, system, wherein the control channel is a Physical Downlink Control Channel, PDCCH, or an enhanced Physical Downlink Control Channel, ePDCCH, and wherein the control data is Downlink Control Information.

27. A radio network node for transmitting user data to a wireless communication device in a wireless communication system that includes a data channel over which user data is transmitted and a control channel over which control data is transmitted, the radio network node comprising:
 a transmitting circuit configured to transmit user data to the wireless communication device or a different wireless communication device over the data channel;
 a forming circuit configured to form a hierarchically modulated symbol which conveys control data on a control-data modulation layer that is recoverable via demodulation at a lower order, and conveys user data on a user-data modulation layer that is recoverable via demodulation at a higher order, wherein the lower order is lower than the higher order and is predefined independent of conditions on the control channel, and the higher order is dynamically adapted in dependence on conditions on the control channel at the wireless communication device; and
 wherein the transmitting circuit is further configured to transmit the hierarchically modulated symbol to the wireless communication device over the control channel to enable the wireless communication device to recover the user data by:
  demodulating both the user-data modulation layer and the control-data modulation layer at the higher order, to obtain higher-order demodulated data;
  disregarding a subset of the higher-order demodulated data corresponding to the control-data modulation layer; and
  recovering the user data as a different subset of the higher order demodulated data corresponding to the user-data modulation layer.

28. The radio network node of claim 27,
wherein the forming circuit is configured to:
 dynamically determine that conditions on the control channel at a wireless communication device to which the control data is addressed support the higher order; and
 to form the hierarchically modulated symbol responsive to that determination; and
wherein the transmitting circuit is configured to transmit the user data responsive to that determination.

29. The radio network node of claim 27, wherein the radio network node is configured to dynamically pair the wireless communication device with a different wireless communication device for hierarchical modulation of the user data and control data respectively addressed to the devices, by:
 evaluating on a transmission interval by transmission interval basis different possible pairings of wireless communication devices whose conditions on the control channel support the higher order; and
 selecting said pairing from the different possible pairings based on maximizing a defined utility metric.

30. The radio network node of claim 29, wherein the defined utility metric characterizes capacity gained by a possible pairing relative to an overhead required for that possible pairing.

* * * * *